US00RE50415E

(19) United States
(12) Reissued Patent
Song et al.

(10) Patent Number: US RE50,415 E
(45) Date of Reissued Patent: May 6, 2025

(54) ICE MAKER

(71) Applicant: SAMSUNG ELECTRONICS CO., LTD., Suwon-si (KR)

(72) Inventors: Myungseob Song, Suwon-si (KR); Minsoo Kim, Suwon-si (KR); Jinkook Yoon, Suwon-si (KR); Jinseung Choi, Suwon-si (KR)

(73) Assignee: Samsung Electronics Co., Ltd., Suwon-si (KR)

(21) Appl. No.: 17/841,949

(22) Filed: Jun. 16, 2022

Related U.S. Patent Documents

Reissue of:
(64) Patent No.: 11,105,547
Issued: Aug. 31, 2021
Appl. No.: 16/962,350
PCT Filed: Jan. 15, 2019
PCT No.: PCT/KR2019/000568
§ 371 (c)(1),
(2) Date: Jul. 15, 2020
PCT Pub. No.: WO2019/143087
PCT Pub. Date: Jul. 25, 2019

(30) Foreign Application Priority Data

Jan. 16, 2018 (KR) ..... 10-2018-0005780

(51) Int. Cl.
*F25D 17/06* (2006.01)
*F25C 1/08* (2006.01)
(Continued)

(52) U.S. Cl.
CPC ..... *F25D 17/065* (2013.01); *F25C 1/08* (2013.01); *F25C 1/18* (2013.01); *F25C 5/08* (2013.01);
(Continued)

(58) Field of Classification Search
CPC ..... F25C 1/08; F25C 5/08; F25C 1/18; F25C 1/24; F25C 5/22; F25C 2700/12;
(Continued)

(56) References Cited

U.S. PATENT DOCUMENTS 5,056,321 A 10/1991 Patrick
5,187,948 A * 2/1993 Frohbieter ..... F25C 1/18 62/353
(Continued)

FOREIGN PATENT DOCUMENTS

CN 1982812 A * 6/2007
CN 206583158 U 10/2017
(Continued)

OTHER PUBLICATIONS

Supplemental European Search report for Application No. EP 19 74 1477 issued Jan. 12, 2021.
(Continued)

*Primary Examiner* — William C Doerrler
(74) *Attorney, Agent, or Firm* — Nixon & Vanderhye P.C.

(57) ABSTRACT

Disclosed is an ice making device that is able to selectively make ices having different transparencies from each other. The ice making device includes: an ice making chamber including an ice making container to accommodate ice making water therein; a cooler configured to supply cool air to the ice making chamber to cool the ice making water; an ice making fan configured to circulate the supplied cool air; an ice making heater configured to supply heat to the ice making water when the ice making water is cooled; and a controller configured to control at least one of the cooling unit, the ice making fan and the ice making heater to adjust a rate of change of temperature of the ice making container to generate one of two types of ice having different transparency.

34 Claims, 27 Drawing Sheets

(51) Int. Cl.

| | |
|---|---|
| ***F25C 1/18*** | (2006.01) |
| ***F25C 1/24*** | (2018.01) |
| ***F25C 5/08*** | (2006.01) |
| ***F25C 5/20*** | (2018.01) |

(52) U.S. Cl.
CPC ..... *F25B 2600/112* (2013.01); *F25C 1/24* (2013.01); *F25C 5/22* (2018.01); *F25C 2305/024* (2021.08); *F25C 2400/08* (2013.01); *F25C 2700/12* (2013.01); *F25D 2317/061* (2013.01); *F25D 2400/40* (2013.01)

(58) Field of Classification Search
CPC ..... F25C 2305/024; F25C 2400/08; F25D 17/065; F25D 2317/061; F25D 2400/40; F25B 2600/112
See application file for complete search history.

(56) References Cited

U.S. PATENT DOCUMENTS

| | | | | |
|---|---|---|---|---|
| 6,935,124 | B2 | 8/2005 | Takahashi et al. | |
| 8,371,133 | B2 * | 2/2013 | Kim | F25C 1/18 62/73 |
| 8,516,846 | B2 | 8/2013 | Lee et al. | |
| 9,574,811 | B2 | 2/2017 | Papalia | |
| 9,599,389 | B2 | 3/2017 | Bortoletto et al. | |
| 10,969,152 | B2 | 4/2021 | Yoon et al. | |
| 2004/0025527 | A1 | 2/2004 | Takahashi et al. | |
| 2004/0050079 | A1 | 3/2004 | Holmes | |
| 2005/0072167 | A1 | 4/2005 | Oh | |
| 2006/0168983 | A1 * | 8/2006 | Tatsui | F25C 5/04 62/340 |
| 2007/0098904 | A1 | 5/2007 | Aschner et al. | |
| 2007/0186570 | A1 * | 8/2007 | Kopf | F25C 5/187 62/135 |
| 2008/0173040 | A1 | 7/2008 | Lim | |
| 2009/0049858 | A1 | 2/2009 | Lee et al. | |
| 2009/0165467 | A1 | 7/2009 | Kim | |
| 2009/0199569 | A1 | 8/2009 | Petrenko | |
| 2009/0223230 | A1 | 9/2009 | Kim | |
| 2009/0308085 | A1 | 12/2009 | DeVos | |
| 2010/0018226 | A1 * | 1/2010 | Kim | F25C 1/18 62/73 |
| 2010/0031675 | A1 | 2/2010 | Kim et al. | |
| 2010/0299846 | A1 | 12/2010 | Holzhauer et al. | |
| 2011/0094254 | A1 | 4/2011 | Kim | |
| 2014/0083127 | A1 | 3/2014 | Jeong et al. | |
| 2015/0107275 | A1 | 4/2015 | Papalia | |
| 2015/0107276 | A1 | 4/2015 | Bortoletto et al. | |
| 2016/0252286 | A1 * | 9/2016 | Jeong | F25C 1/04 62/130 |
| 2016/0302350 | A1 | 10/2016 | Kinzenbaw et al. | |
| 2017/0023283 | A1 | 1/2017 | Boarman | |
| 2017/0074571 | A1 | 3/2017 | Boarman et al. | |
| 2017/0122637 | A1 | 5/2017 | Mor | |
| 2017/0321943 | A1 | 11/2017 | Ji et al. | |
| 2018/0187941 | A1 * | 7/2018 | An | F25C 5/08 |
| 2018/0231294 | A1 | 8/2018 | Song et al. | |
| 2020/0064043 | A1 * | 2/2020 | Larson | F25C 5/08 |
| 2020/0378670 | A1 * | 12/2020 | Bertolini | F25C 1/22 |

FOREIGN PATENT DOCUMENTS

| | | | |
|---|---|---|---|
| DE | 9 004 370 | U | 8/1990 |
| DE | 102010029500 | A1 * | 1/2011 |
| EP | 3 361194 | | 8/2018 |
| JP | H01-179879 | A | 7/1989 |
| JP | H01-181059 | A | 7/1989 |
| JP | H01-219463 | A | 9/1989 |
| JP | H02-122177 | A | 5/1990 |
| JP | 2-254276 | | 10/1990 |
| JP | H02-254276 | A | 10/1990 |
| JP | 5-3867 | | 1/1993 |
| JP | H053867 | U | 1/1993 |
| JP | 2001-041623 | | 2/2001 |
| JP | 2011-112279 | | 2/2001 |
| JP | 2004-347310 | | 12/2004 |
| JP | 2004-0347310 | A | 12/2004 |
| JP | 2005-331200 | A | 12/2005 |
| JP | 4680311 | B | 3/2011 |
| JP | 4680311 | B2 | 5/2011 |
| JP | 2011-185541 | A | 9/2011 |
| KR | 10-2006-0059632 | A | 6/2006 |
| KR | 10-2006-0060450 | A | 6/2006 |
| KR | 10-2007-0077672 | A | 7/2007 |
| KR | 10-2007-0119271 | A | 12/2007 |
| KR | 10-0833860 | | 6/2008 |
| KR | 10-2008-0061469 | | 7/2008 |
| KR | 10-2009-0019322 | A | 2/2009 |
| KR | 10-1500731 | B | 9/2009 |
| KR | 10-2009-0129922 | | 12/2009 |
| KR | 10-1519877 | B | 12/2009 |
| KR | 10-2010-0124068 | A | 11/2010 |
| KR | 10-2011-0080101 | | 7/2011 |
| KR | 10-1613415 | B | 7/2011 |
| KR | 10-2013-0020063 | A | 2/2013 |

OTHER PUBLICATIONS

Korean Office Action for Application No. KR 10-2018-005870 issued Jan. 21, 2022.
Korean Office Action for Application No. 10-2022-0008789 issued Feb. 28, 2022.
Non-Final Office Action in U.S. Appl. No. 16/962,350 mailed Nov. 12, 2020.
WO/ISR for PCT/KR2019/000568 dated Apr. 30, 2019.
Korean Office Action for KR Application No. 10-2018-0005779 issued Jan. 21, 2021.
International Search Report for International Application No. PCT/KR2019/000540 issued May 8, 2019.
Extended European Search Report for EP Application No. 19151463.7 issued Jun. 13, 2019.
Notification of the First Office Action in CN Application No. 201980006577.4 issued Aug. 23, 2021.
Written Opinion for International Application No. PCT/KR2019/000540 issued May 8, 2019.
Reissue U.S. Appl. No. 17/841,248, filed Jun. 15, 2022 (Reissue of U.S. Pat. No. 10,969,152).
European Office Action dated Nov. 18, 2022 for EP Application No. 19741477.4.
European Extended Search Report dated Jan. 20, 2023 for EP Application No. 22201388.0.
European Extended Search Report dated Jan. 24, 2023 for EP Application No. 22206464.4.
Korean Notice of Allowance dated Aug. 9, 2022 for KR Application No. 10-2022-0008789.
Korean Office Action dated Jul. 11, 2022 for KR Application No. 10-2018-0005780.
European Office Action dated Nov. 19, 2024 for EP Application No. 22201388.0.
European Office Action dated Nov. 22, 2024 for EP Application No. 22206464.4.
International Search Report dated Apr. 30, 2019 in corresponding International Application No. PCT/KR2019/00568.
Extended European Search Report dated Jan. 12, 2021 in European Patent Application No. 19741477.4.

* cited by examiner

| TRANSPARENCY [%] | 20 | 40 | 60 | 80 | 90 |
|---|---|---|---|---|---|
| ICE QUANTITY [kg/day] | 1.7 | 1.4 | 1.0 | 0.8 | 0.4 |
| RATE OF CHANGE OF TEMPERATURE OF ICE MAKING CONTAINER [° C/min] | -0.09 | -0.07 | -0.05 | -0.025 | -0.015 |

ICE MAKER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a U.S. National Stage Application which claims the benefit under 35 U.S.C. § 371 of International Patent Application No. PCT/KR2019/000568 filed on Jan. 15, 2019, which claims foreign priority benefit under 35 U.S.C. § 119 of Korean Patent Application No. 10-2018-0005780 filed on Jan. 16, 2018, in the Korean Intellectual Property Office, the contents of all of which are incorporated herein by reference.

TECHNICAL FIELD

The disclosure relates to an ice making device, and more particularly, to an ice making device which is able to selectively make ice cubes with different degrees of transparency.

BACKGROUND ART

A refrigerator supplies cool air to a storage chamber by using a freezing cycle and stores food at a low temperature, and may produce ice cubes by supplying cool air to an ice making chamber.

The ice making chamber maintains a condition of below 0□, the freezing point, in the state where an ice making mold is filled with ice making water. The ice making water in the ice making mold start being cooled from the area initially contacting surrounding cool air and freezing advances in a central direction. That is, the ice making water in the ice making mold starts being cooled from the surface or an inner circumference of the ice making mold that initially contacts surrounding cool air and then ice nucleation is formed and then extends to the center of the ice making mold filled with ice making water and then ice cubes are produced as a whole. Ice making water supplied to the ice making mold contains a certain quality of air bubbles. Such air bubbles should be promptly discharged into the air to make transparent ice cubes. However, during an actual ice making process, as the surface is firstly frozen as described above, air bubbles are not discharged into the air and remains in the ice making water, thereby producing opaque ice cubes.

A technology which sinks a thawing stick giving off heat into ice making water in an ice making container during an ice making process in order to discharge air bubbles obstructing production of transparent ice cubes to the outside has been disclosed. According to a prior art, the entire inner circumference, i.e. a lateral side and a lower side simultaneously start forming ice toward the center.

A user does not always need transparent ice cubes of high quality, and may need transparent ice cubes of average quality or of low quality as necessary. Making transparent ice cubes of high quality slows down the ice making speed and reduces the quantity of ice cubes. Meanwhile, transparent ice cubes of low quality are made at a faster ice making speed but ice cubes are less transparent.

Technical Problem

An aspect of the disclosure is to solve the conventional problems described above, and provide an ice making device that is able to selectively make ice with the degree of transparent as desired by a user.

Technical Solution

According to an embodiment of the disclosure, there is provided an ice making device. The ice making device includes: an ice making chamber including an ice making container to accommodate ice making water therein; a cooler configured to supply cool air to the ice making chamber to cool the ice making water; an ice making fan configured to circulate the supplied cool air; an ice making heater configured to supply heat to the ice making water when the ice making water is cooled; and a controller configured to control at least one of the cooling unit, the ice making fan and the ice making heater to adjust a rate of change of temperature of the ice making container to generate one of two types of ice having different transparency. According to the disclosure, ice cubes may be made by selecting a transparency of the ice cubes according to a rate of change of temperature of the ice making container.

The ice making device may further include a temperature sensor installed in the ice making container to measure a temperature of the ice making container. Accordingly, the controller may adjust the rate of change of temperature of the ice making container in real-time by referring to the temperature of the ice making container measured by the temperature sensor in real-time.

The controller may be configured to reduce an output of the ice making heater and raise an output of the cooler and the ice making fan if the rate of change of temperature of the ice making container is lower than a set rate of change. Accordingly, the set rate of change may be followed.

The controller may configured to raise an output of the ice making heater and reduce an output of the cooler and the ice making fan if the rate of change of temperature of the ice making container is higher than a set rate of change. Accordingly, the set rate of change may be followed.

The two types of ice having different transparency may be generated in a fast ice making mode and a transparent ice making mode according to the rate of change of temperature of the ice making container. Accordingly, a user may select various ice making modes.

The fast ice making mode, the rate of change of temperature of the ice making container may be set above 0.08 (° C./min), and in the transparent ice making mode, the rate of change of temperature of the ice making container may be set below 0.03 CC/min).

The ice making device may further include a normal ice making mode, in which the rate of change of temperature may be set above 0.03 CC/min) and below 0.08 CC/min).

The controller may be configured to turn off the ice making heater in the fast ice making mode.

The controller may be configured to vary an output of the ice making heater in the transparent ice making mode. Accordingly, more transparent ice cubes may be obtained.

The controller may be configured to turn on and off power of the ice making heater in a preset number of times in the transparent ice making mode. Accordingly, more transparent ice cubes may be obtained.

The temperature of the ice making container at the time of separation of ice cubes in the transparent ice making mode may be higher than a temperature of the ice making container at the time of separation of ice cubes in the fast ice making mode.

The ice making heater may include a heating rod configured to extend from a surface of the ice making water to a bottom of the ice making container to be soaked into the ice making water and transfer heat to the ice making water, and a rotation shaft connected to the heating rod and configured to extend to cross an upper part of the ice making container and rotate the heating rod to separate the heating rod from the ice making container. Accordingly, ice making and ice separating processes may be performed together.

The heating rod may be configured to extend to a bottom of the ice making container within a range of not obstructing rotation. Accordingly, as an ice formation direction is controlled as one direction, highly transparent ice cubes may be obtained.

The rotation shaft may include a hollow part in a longitudinal direction, and the ice making heater may include a heater accommodated in the hollow part of the rotation shaft and heating the heating rod. Accordingly, heating and ice separation structures may be simplified.

The heater may be provided to cause a first air gap to exist between the heater and an internal circumference of the rotation shaft. Accordingly, deterioration of durability due to rotation of the rotation shaft may be prevented.

The ice making device may further include a heater supplying heat to a rotation driver rotating the rotation shaft and to the heating rod, and the rotation shaft may be includes a first rotation shaft configured to support the heater and including the heating rod, and a second rotation shaft coupled to the first rotation shaft and configured to transfer a driving force of the rotation driver to the first rotation shaft.

The first rotation shaft may include a material with a high heat conductivity, and the second rotation shaft may include a material with a heat conductivity lower than the first rotation shaft. Accordingly, conditions for uniform temperature of the ice making container may be created.

The second rotation shaft may be provided to cause a second air gap to exist between the second rotation shaft and the first rotation shaft. Accordingly, conditions for uniform temperature of the ice making container may be created.

The ice making device may further include a heater configured to supply heat to the heating rod, and the heating rod may include a hollow part provided inside and has the heater accommodated in the hollow part. Accordingly, heat may be easily transferred to the heating rod.

According to another embodiment of the disclosure, there is provided an ice making device. The ice making device includes: a main body including an ice making chamber; a cooler configured to supply cool air to the ice making chamber; an ice making unit including an ice making container installed in the ice making chamber and being able to accommodate ice making water therein and an ice making heater configured to transfer heat to the ice making water; an ice making fan configured to circulate cool air of the ice making chamber; a temperature sensor configured to be able to measure a temperature of the ice making container; and a controller configured to control at least one of the cooling unit, the ice making fan and the ice making heater and adjusts a rate of change of temperature of the ice making container to generate one of two types of ice having different transparency.

According to still another embodiment of the disclosure, there is provided a driving method of an ice making device, The driving method of the ice making device includes: filling an ice making container with ice making water; measuring a temperature of the ice making container in real-time; and controlling at least one of the cooler, the ice making fan and the ice making heater and adjusting a rate of change of temperature of the ice making container to generate one of two types of ice having different transparency based on the temperature of the ice making container that has been measured in real-time.

Advantageous Effects

As described above, an ice making device according to the disclosure has the following effects:

First, ice cubes with various qualities of transparent may be produced and the quantity of ice may be selected according to various demands of consumers.

Second, a simple structure is guaranteed by a heating and ice separating part that performs both heating and ice separating functions for making transparent ice.

Third, transparency of ice may be improved by varying the output of a heater or repeatedly turning on and off power of the heater at the time of making ice.

Fourth, durability of a heater may be improved as a rotation shaft rotates leaving a gap with a heater inserted thereinto.

Fifth, a rotation shaft is manufactured as a first rotation shaft made of metal having high heat conductivity and a second rotation shaft made of plastic which can be made by injection molding and the first and second rotation shafts are coupled to each other to maintain a second air gap therebetween, thereby enabling the rotation shafts to be easily manufactured and effectively controlling heat conductivity.

BEST MODE

Below, embodiments of the disclosure will be described in detail with reference to accompanying drawings, to be easily carried out by a person having an ordinary skill in the art. The disclosure may be embodied in various different forms, and not limited to the embodiment set forth herein. For clarity of description, like numerals refer to like elements throughout.

An ice making device 1 according to an embodiment of the disclosure includes a refrigerator having a refrigerating chamber and a freezing chamber for making ice, a freezer having a freezing chamber to exclusively produce ice, and an ice maker for exclusively producing ice. The ice making device 1 according to an embodiment of the disclosure may include a stand-alone refrigerator or built-in freezer in an indirect or direct cooling manner.

Below, an entire structure of a refrigerator will be described with reference to FIGS. 1 and 2.

Figure 1:
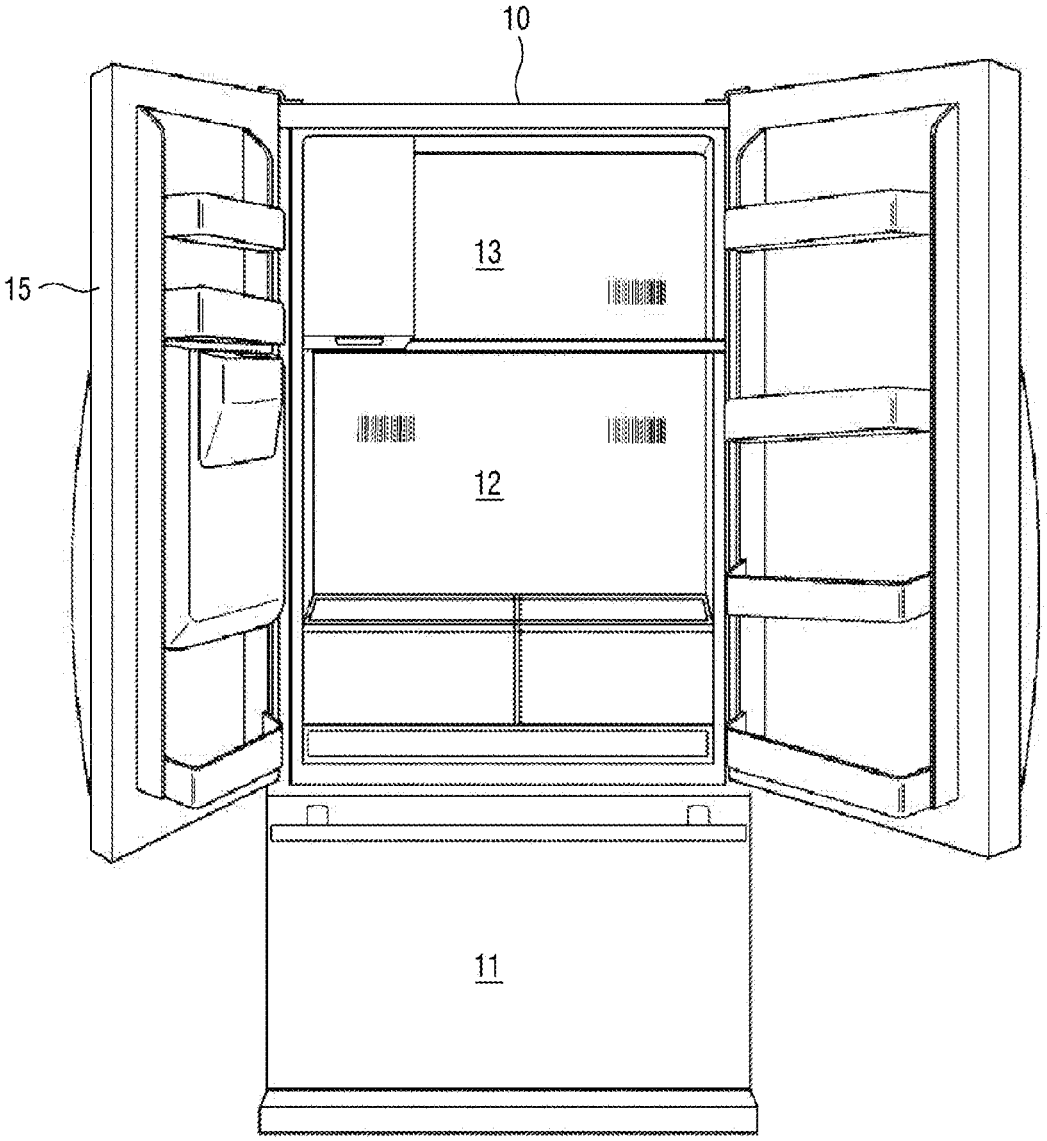
FIG. 1 is a front view of a stand-alone refrigerator with its door being open according to an embodiment of the disclosure.
Figure 2:
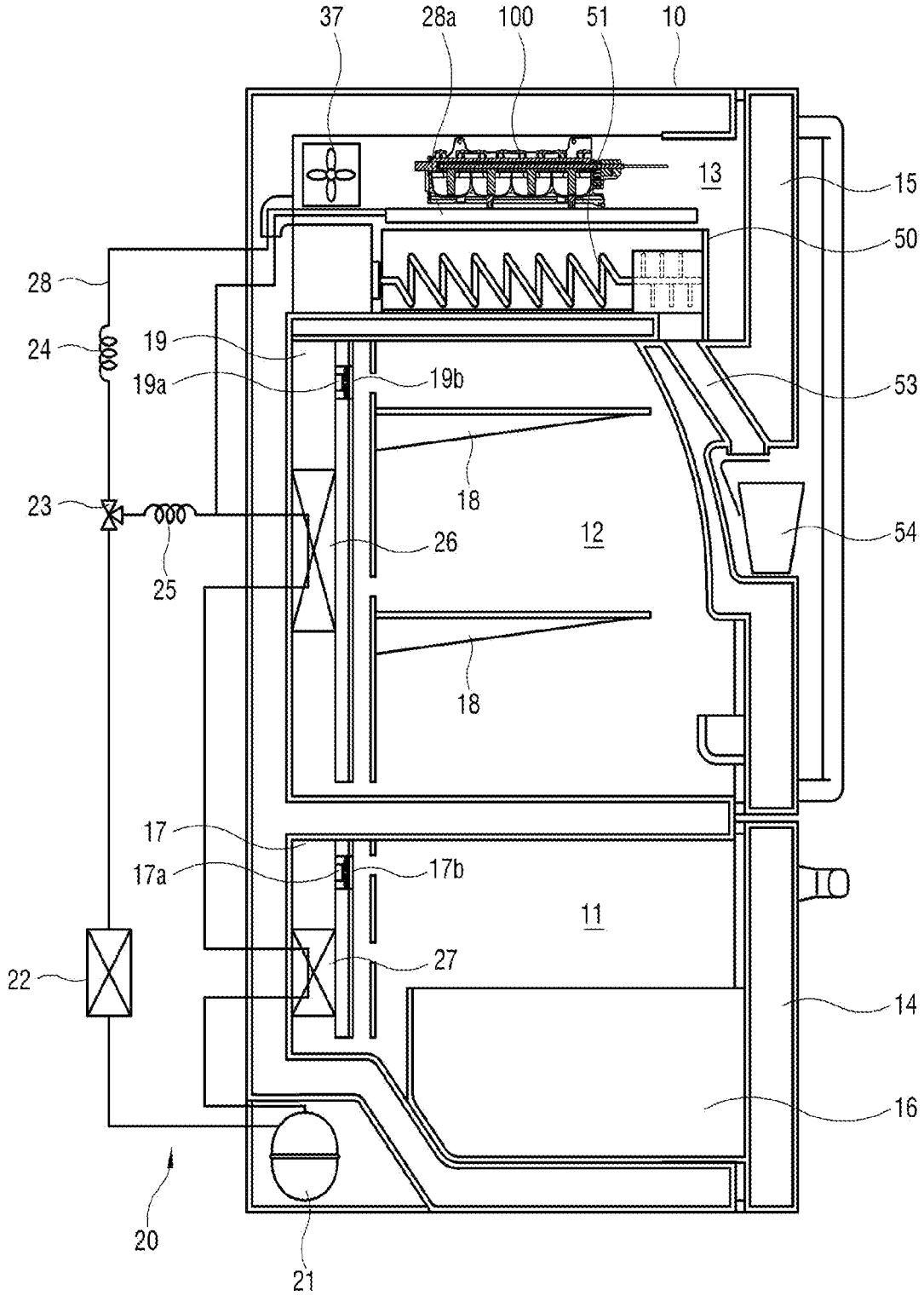
FIG. 2 is a cross-sectional view showing lateral sectional surface of a stand-alone refrigerator according to an embodiment of the disclosure.

FIGS. 1 and 2 are a front view of a refrigerator with its door being open and a cross-sectional view of the refrigerator according to an embodiment of the disclosure.

As shown therein, a refrigerator may include a main body 10 having a freezing chamber 11, a refrigerating chamber 12 and an ice making chamber 13, a freezing chamber door 14 to open and close the freezing chamber 11, a refrigerating chamber door 15 to open and close the refrigerating chamber 12, and a cooling unit 20 to supply cool air to the freezing chamber 11, the refrigerating chamber 12 and the ice making chamber 13.

A user may open the freezing chamber door 14 and store items in the freezing chamber 11. The freezing chamber 11 may have a freezing box 16 inside, and a user may freeze and store items in the freezing box 16.

The freezing chamber 11 may have a first cool air supply duct 17 in a rear wall thereof. In the first cool air supply duct 17, an evaporator 27 of the cooling unit 20 for freezing chamber, a freezing fan 17a and a cool air outlet 17b for freezing chamber. The freezing fan 17a may supply cool air, which has been heat-exchanged by the evaporator 27 for freezing chamber to the freezing chamber 11 through the cool air outlet 17b for freezing chamber.

A user may open the refrigerating chamber door 15 and store items in the refrigerating chamber 12. In the refrigerating chamber 12, a plurality of shelves 18, and a user may refrigerate and store items by putting the articles on the shelves 18.

The refrigerating chamber 12 may have a second cool air supply duct 19 in a rear wall thereof. In the second cool air supply duct 19, an evaporator 26 of the cooling unit 20 for refrigerating chamber, a refrigerating fan 19a, and a cool air outlet 19b for refrigerating chamber. The refrigerating fan 19a may supply cool air, which has been heat-exchanged by the evaporator 26 for refrigerating chamber to the refrigerating chamber 12 through the cool air outlet 19b for refrigerating chamber.

The ice making chamber 13 may be partitioned from the refrigerating chamber 12 by an ice making chamber case 31 forming a predetermined space inside and may be insulated from the refrigerating chamber 10 for st2.

In the ice making chamber 13, an ice making unit 100 for making ice cubes, and an ice storage container 50 for storing therein ice cubes made by the ice making unit 100. Ice cubes made by the ice making unit 100 may be stored in the ice storage container 50. Ice cubes stored in the ice storage container 50 may be transferred to an ice crusher 52 by a transferring device 51. Ice which is crushed into pieces by the ice crusher 52 may be supplied to a dispenser 54 by passing through an ice discharging duct 53.

In the ice making unit 100, at least a part of a refrigerant pipe 28 of the cooling unit 20. A direct cooling part 28a of the refrigerant pipe 28 of the cooling unit 20 may be inserted into the ice making chamber 13, and the direct cooling part 28a of the refrigerant pipe 28 inserted into the ice making chamber 13 may be installed in the ice making unit 100. The direct cooling part 28a of the refrigerant pipe 28 may directly cool the ice making unit 100 by directing contacting the same.

In the ice making chamber 13, an ice making fan 37 may be installed to circulate internal air. The ice making fan 37 forcibly sends air from the ice making chamber 13 to the direct cooling part 28a of the refrigerant pipe 28 or the ice making unit 100 so that air in the ice making chamber 13 may be cooled by heat exchange with the direct cooling part 28a of the refrigerant pipe 28 or the ice making unit 100.

The cooling unit 20 as a cooler may include a compressor 21, a condenser 22, a transfer valve 23, a first expansion valve 24, a second expansion valve 25, an evaporator 26 for refrigerating chamber, an evaporator 27 for freezing chamber and a refrigerant pipe 28.

The refrigerant pipe 28 may connect the compressor 21, the condenser 22, the first expansion valve 24, the second expansion valve 25, the evaporator 26 for refrigerating chamber and the evaporator 27 for freezing chamber. A refrigerant flowing through the refrigerant pipe 28 may be discharged from the compressor 21 and then pass through the condenser 22 and the second expansion valve 25, and then be supplied to the evaporator 26 for refrigerating chamber and the evaporator 27 for freezing chamber. In the evaporator 26 for refrigerating chamber, the refrigerant may exchange heat with air in the refrigerating chamber 12 and cool the air therein. The refrigerant supplied to the evaporator 27 for freezing chamber may exchange heat with air in the freezing chamber 11 and cool the air therein. The refrigerant flowing through the refrigerant pipe 28 may pass through the first expansion valve 24, and then pass through the direct cooling part 28a of the ice making chamber 12, and be sequentially supplied to the evaporator 26 for refrigerating chamber and the evaporator 27 for freezing chamber.

In FIG. 2, the direct cooling method through which the refrigerant directly passes through the direct cooling part 28a of the refrigerant pipe 28 is described as an example, but an indirect cooling method by the evaporator for ice making chamber may also apply.

Figure 3:
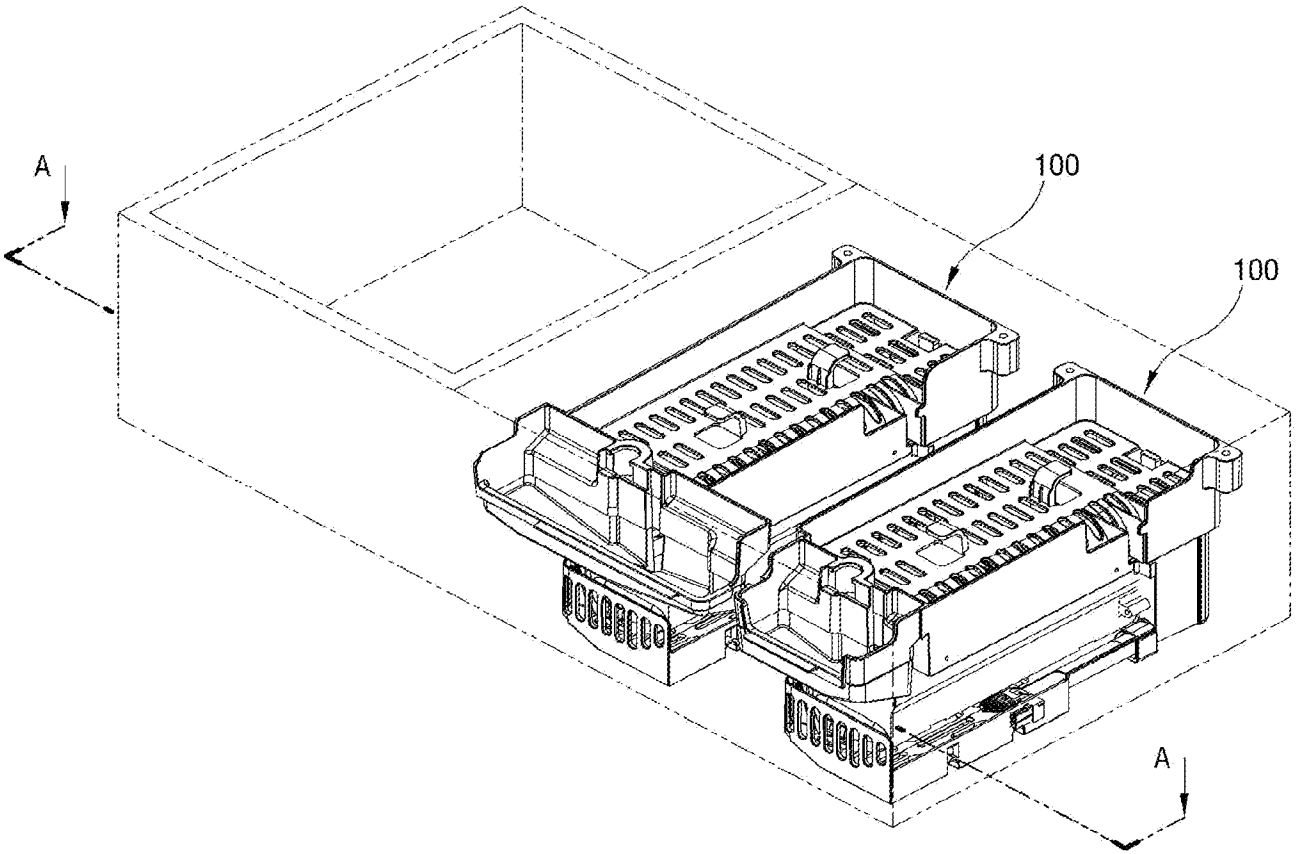
FIG. 3 is a perspective view of a built-in freezer according to an embodiment of the disclosure.
Figure 4:
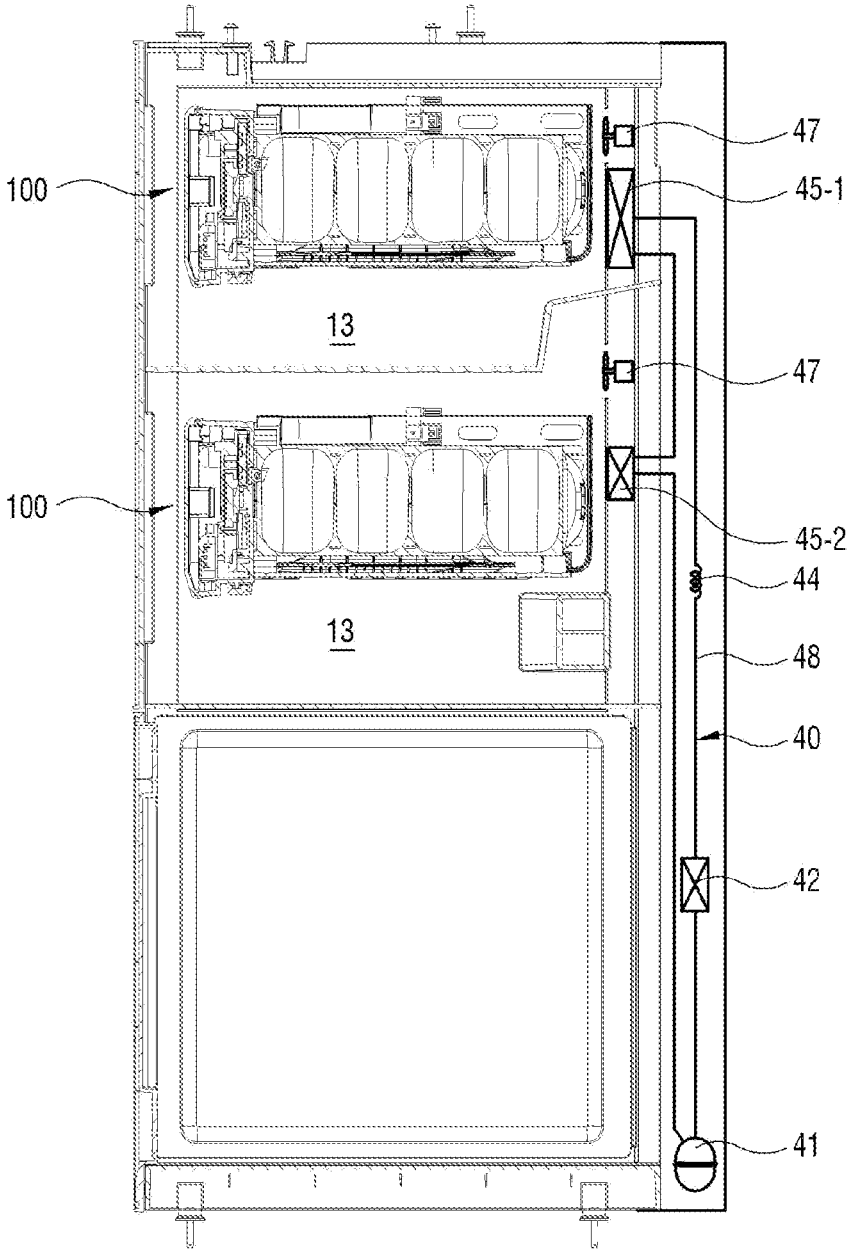
FIG. 4 is a cross-sectional view of a built-in freezer according to an embodiment of the disclosure.
Figure 5:
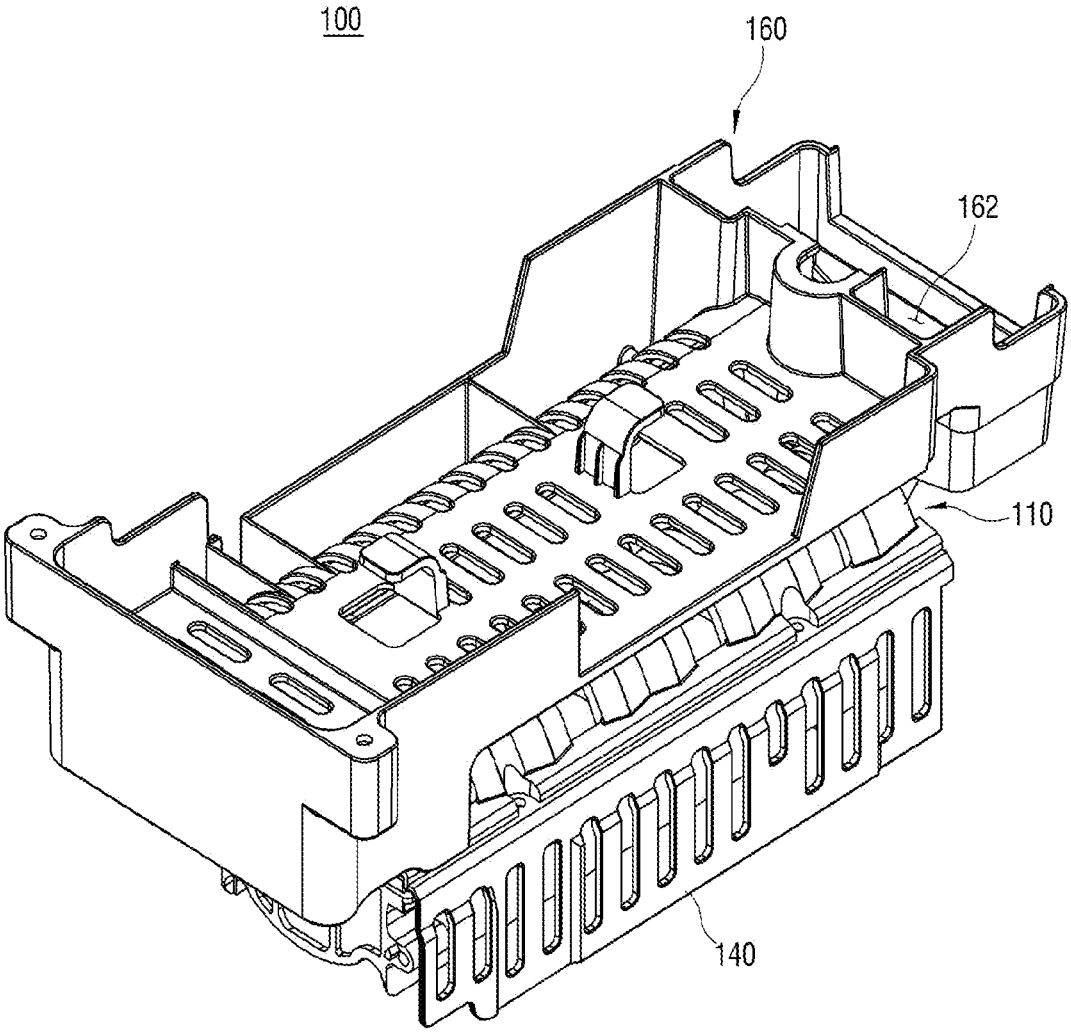
FIG. 5 is a perspective view of an ice making device that is mounted in an ice making chamber according to an embodiment of the disclosure.
Figure 6:
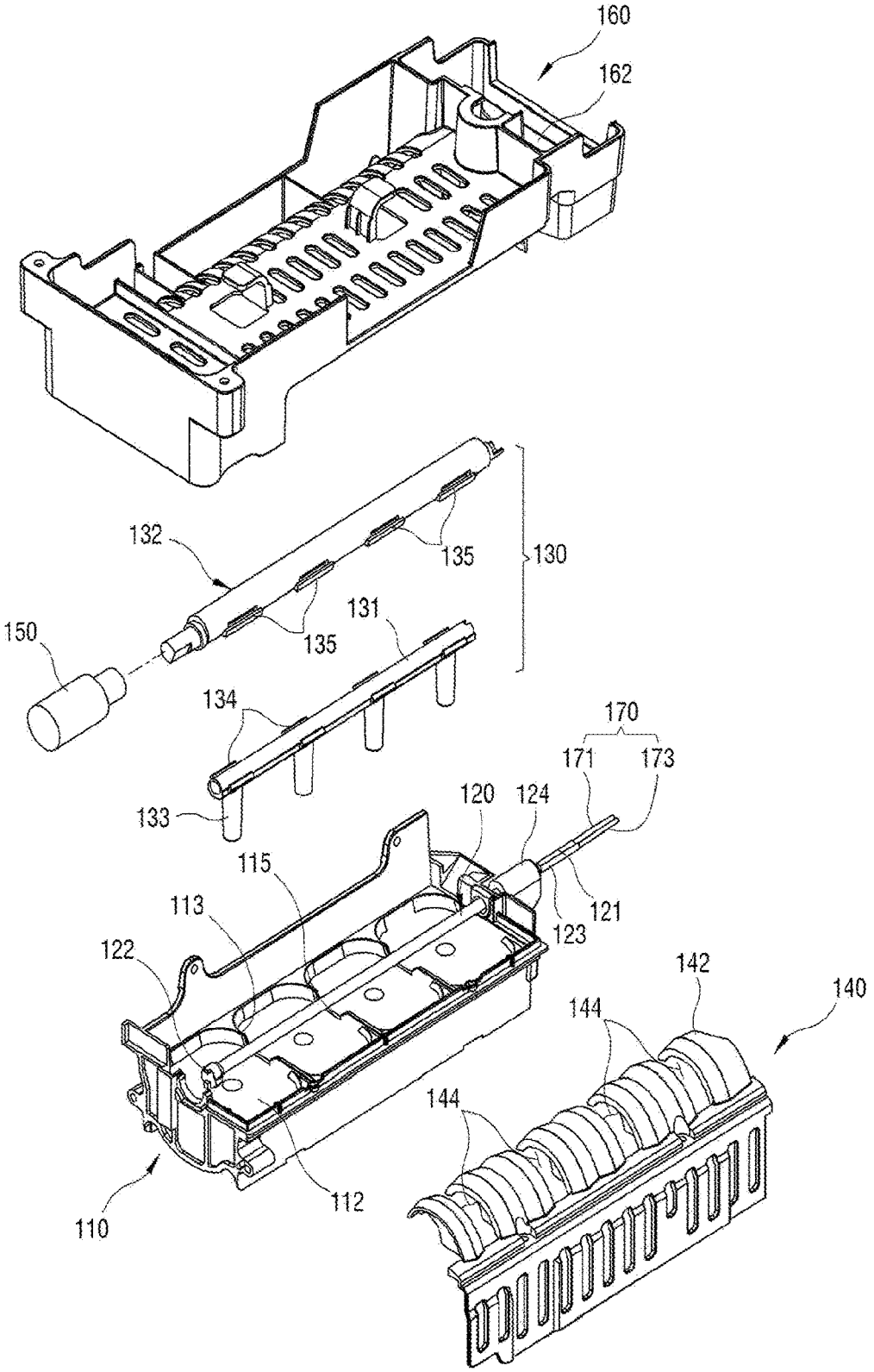
FIG. 6 is an exploded perspective view of an ice making device according to an embodiment of the disclosure.
Figure 7:
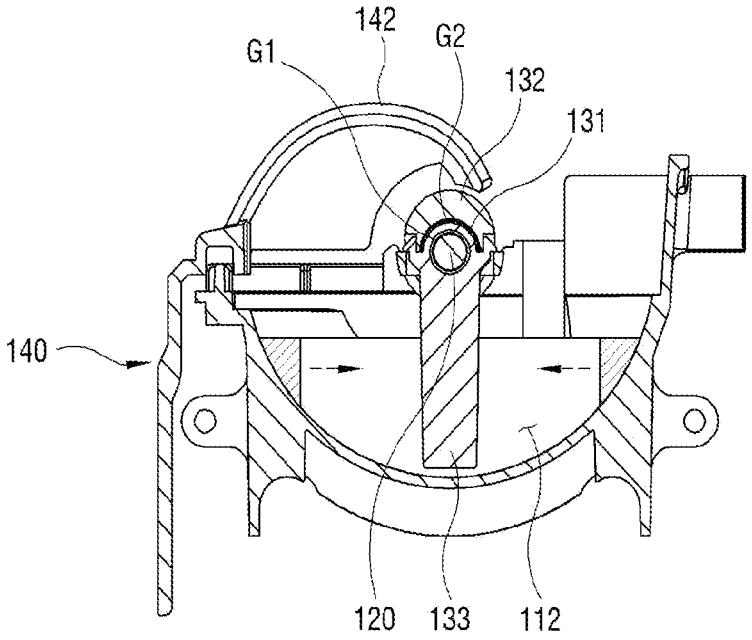
FIGS. 7 to 9 are longitudinal cross-sectional view, transverse cross-sectional view and plan cross-sectional view of an ice making device.
Figure 8:
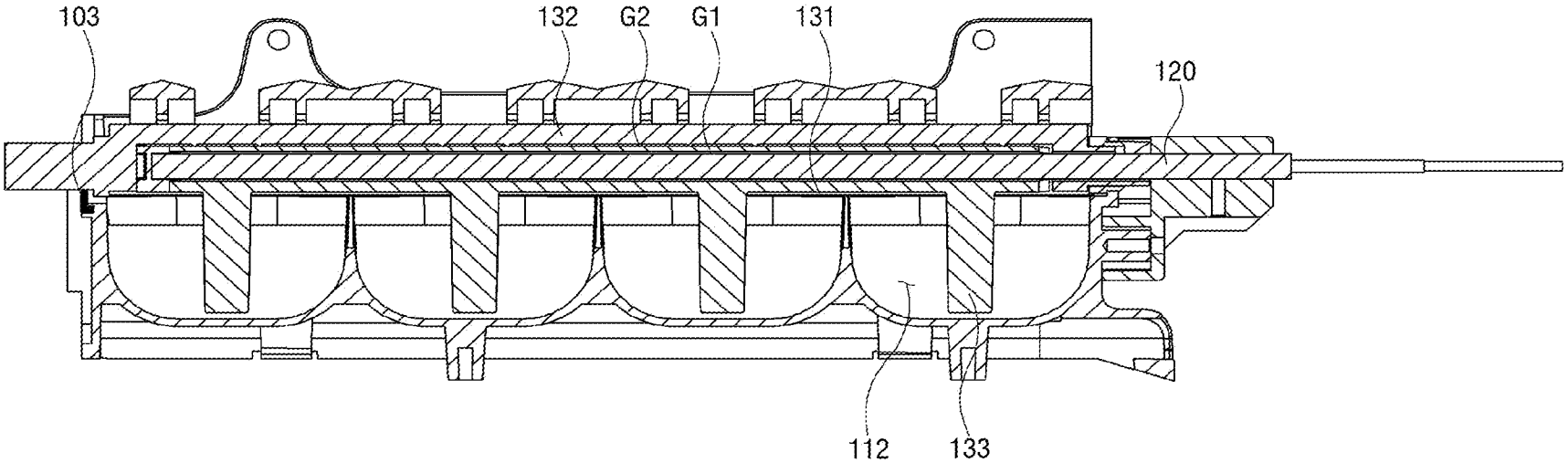
Figure 9:
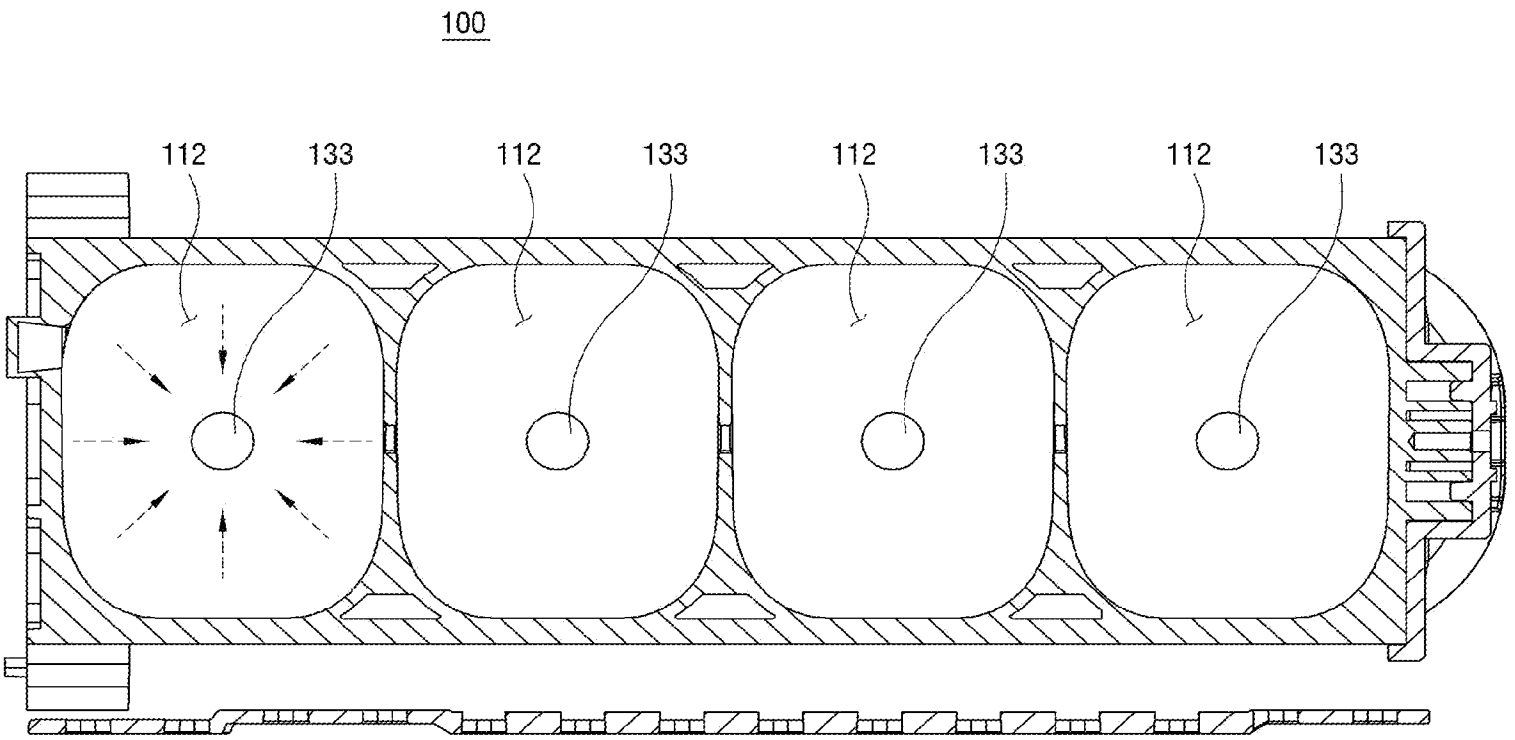

FIGS. 3 and 4 are a perspective view and a cross-sectional view of a freezer according to an embodiment of the disclosure. The freezer according to the embodiment employs an indirect cooling method, but not limited thereto. The freezer may employ a direct cooling method. With respect to the freezer according to the embodiment, the portion similar to the refrigerator which has been described with reference to FIGS. 1 and 2 is given the same reference numeral and is not described below.

As shown in FIGS. 3 and 4, a freezer includes a cooling unit 40, at least one ice making fan 47 and two ice making units 100 which are employed in the ice making chamber 13.

In the ice making chamber 13, two ice making units 100 are mounted to make ice cubes, and cool air is introduced from an evaporator 45 to the ice making units 100 through an ice making fan 37. Below the two ice making units 100, an ice storage container (not shown) is provided to accommodate therein ice cubes transferred from the ice making units 100. Two ice making water supply pipes (not shown) run into the ice making chamber 13 to supply ice making water to the two ice making units 100. Ice making water supplied by the ice making water supply pipe may be pre-treated such as filtering and sterilization.

The cooling unit 40 includes a compressor 41, a condenser 42, an expansion valve 44, first and second evaporators 45-1 and 45-2, and a refrigerant pipe 48. The refrigerant pipe 48 connects the condenser 42, the expansion valve 44, the first and second evaporators 45-1 and 45-2. A refrigerant flowing through the refrigerant pipe 48 is discharged from the compressor 41, and then passes through the condenser 42 and the expansion valve 44 and then is supplied to the first and second evaporators 45-1 and 45-2. In the evaporator 45, the refrigerant may exchange heat with air in the ice making chamber 13 and cool the air therein.

The ice making fan 47 forcibly circulates the air cooled by the first and second evaporators 45-1 and 45-2 and lowers a temperature of the ice making chamber 13.

The ice making unit 100 produces ice cubes by cooled air. Normally, one of the two ice making units 100 is used to make transparent ice cubes and the other one is used to make ice cubes quickly. As the case may be, all of the two ice making units 100 may be used to make transparent ice cubes or to make ice cubes quickly.

FIGS. 5 to 9 are a perspective view, an exploded perspective view, a longitudinal cross-sectional view, a transverse cross-sectional view and a plan cross-sectional view of an ice making device 100 according to a first embodiment of the disclosure.

The ice making unit 100 includes an ice making container 110 having a space to accommodate ice making water therein, ice making heaters 120 and 130 supplying heat to ice making water in the ice making container 110, an ice separation guide unit 140, a rotation driver 150 to rotate the heating and ice separating part to separate the ice cubes after they are made, a container supporter 160, and an electric wire 170 to supply power to the ice making heaters 120 and 130. The ice making unit 100 includes a temperature sensor 103 that is mounted in the ice making container 110. The temperature sensor 103 measures a temperature of the ice making container 110 and provides information to control temperature of the ice making chamber 13 and the ice making container 110.

The ice making container 110 includes a material with a predetermined heat conductivity or higher, e.g. includes aluminum material. The ice making container 110 is an ice making tray and includes, e.g. four ice making cells 112 that are divided by a partition wall 113 and are arranged side by side. The partition wall 113 includes an overflow part 115 which causes ice making water to overflow into an adjacent ice making cell 112. Each ice making cell 112 includes an internal circumferential surface shaped like a hemisphere, but the shape of the internal circumferential surface is not limited thereto.

The ice making heaters 120 and 130 include a heater 120 to generate heat, and a heat and ice separating part 130 extending from an upper surface of ice making water to a bottom of the ice making container 110 and being soaked in ice making water, transferring heat from the heater 120 to ice making water while ice making water is being cooled, and being rotatable during separation of ice cubes.

The heater 120 includes, e.g. tungsten which releases heat by resistance if power is applied by the electric wire 170. The heater 120 include first and second heating wires 121 and 123 to which positive and negative power are applied. The electric wire 170 includes first and second electric wires 171 and 172 that are connected to the first and second heating wires 121 and 123, respectively. The first and second heating wires 121 and 123 are connected to each other in ends parts thereof and generate heat by resistance when positive and negative power are applied. The heater 120 extends above the ice making cells 112 and extends in a direction in which the ice making cells 112 are arranged, and is supported by the ice making container 110. A side of the heater 120 is fixed by a heater cap 122, and the other side thereof is fixed by a heater holder 124. The heater 120 may be coated or covered with a material with a predetermined heat conductivity or higher, or may be inserted into a metal pipe with a predetermined heat conductivity or higher. The heater 120 is fixed and acts as a center of rotation of the heating and ice separating part 130. However, depending on design, the heater 120 may be supported to rotate together with the heating and ice separating part 130 rather than being fixed.

Figure 10:
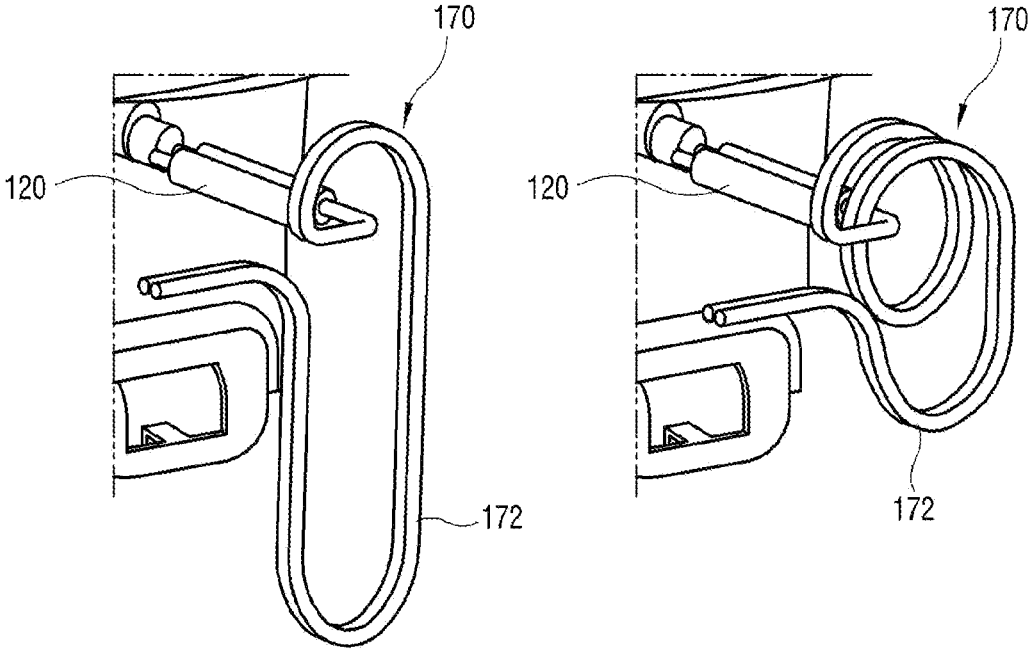
FIG. 10 illustrates a state of a wire connected to a heater in FIG. 6 when ice is made and separated.

FIG. 10 illustrates a state of the electric wire 170 connected to the heater 120 when ice is made and separated. As shown therein, the electric wire 170 extends in a transverse direction with respect to a longitudinal direction of the heater 120, i.e. extends in a rotation direction and is wound at least once centering around the heater 120 at an initial stage while ice cubes are made. The electric wire 170 includes an excess electric wire 172 that is not wound and droops to be additionally wound when the heater 120 rotates at the time of a separation of ice cubes. At the time of the separation of ice cubes, the excess electric wire 172 of the electric wire 170 is additionally wound according to normal rotation of the heater 120. When ice cubes are made again, the excess electric wire 172 is unwound and droops again by reverse rotation of the heater 120. The electric wire 170 is arranged to be smoothly wound and unwound by normal rotation and reverse rotation at the time of separation of ice cubes and making ice. In addition to structural design of the electric wire 170, durability of electric wire 170 may be further enhanced if a covering of the electric wire 170 employs a flexible material such as silicon or Teflon. Durability of the electric wire 170 may be also improved if a bend radius of the electric wire 170 is increased at the time of design of a tool for winding and unwinding the electric wire 170. With a smooth winding and unwinding structure of the electric wire 170, a wire core may be reduced, e.g. from 0.16 φ to 0.08 φ.

The heating and ice separating part 130 includes a rotation shafts 131 and 132 having a hollow part, and a heating rod 133 heating ice making water in the ice making cells 112.

The rotation shafts 131 and 132 include a first rotation shaft 131 and a second rotation shaft 132 that may be coupled to each other and may be decoupled from each other. The second rotation shaft 132 is coupled to the first rotation shaft 131 and delivers rotation power. The rotation shafts 131 and 132 are not limited to being divided into the first and second rotation shafts 131 and 132, and may be integrally manufactured.

The heater 120 is inserted into, or is supported in, a hollow part of the first rotation shaft 131. The first rotation shaft 131 is inserted so that a first gap G1 exists between the first rotation shaft 131 and the heater 120. The first gap G1 may be filled with air or thermal grease. The first rotation shaft 131 and the heating rod 133 may be integrally formed and may include a metal material with a heat conductivity being a predetermined value or higher.

The first rotation shaft 131 includes at least a pair of hooks 134 formed on an external circumference of the first rotation shaft 131 to be coupled to the second rotation shaft 132 by hook. The hooks 134 have a step in an end part thereof which upwardly projects from an external circumference of the first rotation shaft 131 and may elastically transform.

According to another embodiment, the first rotation shaft may be shaped like a semicircle with its upper part being open, and the second rotation shaft may be shaped like a semicircle with its lower part being open. As the first and second rotation shafts are coupled to each other, a shaft opening may be formed in a cylindrical shape so that the heater can be inserted thereinto. The heater may be inserted into a shaft opening so that an internal circumference of and a gap of the first and second rotation shafts may exist. The gap may be filled with air or thermal grease.

The second rotation shaft 132 is coupled to the first rotation shaft 131 in a longitudinal direction, and has an end part being connected to the rotation driver 150 to receive rotation power. The second rotation shaft 132 is coupled to the first rotation shaft 131 to cause a semicircular second gap G2 to exist between the second rotation shaft 132 and the heater 120. The second gap G2 may be filled with air or thermal grease. The second gap G2 prevents heat from the heater 120 from being transferred to the second rotation shaft 132 through an upper part of the first rotation shaft 131. The second rotation shaft 132 includes at least a pair of hook locking part 135 formed on an external circumference thereof to be engaged with the hook 134 of the first rotation shaft 131 by hook. The pair of hook locking part 135 include a locking projection extending from an external circumference of the second rotation shaft 132 in left and right sides thereof. The hook 134 of the first rotation shaft 131 is coupled by hook after passing through the locking projection of the hook locking part 135. The second rotation shaft 132 includes a materials with a heat conductivity being a predetermined value or lower and which enables an injection molding, e.g. includes a plastic material. According to another embodiment, the second rotation shaft 132 may be omitted, and the first rotation shaft 131 may directly receive driving power from the rotation driver 150.

The hook coupling of the first and second rotation shafts 131 and 132 is an example, and the first and second rotation shafts 131 and 132 may be coupled by, e.g. adhesive or tight fit.

The heating rod 133 may shaped like a rod or may have a shape from among various sold shapes such as a cylinder. The heating rod 133 extends integrally, e.g. vertically with respect to a longitudinal direction of the first rotation shaft 131. The heating rod 133 extends from an upper surface of ice making water to a bottom of the ice making cells 112 and is soaked into ice making water. The heating rod 133 may extend to a bottom of the ice making cells 112. An end part of the heating rod 133 may be located by leaving an excess space with an internal circumference of the ice making cells 112 for the heating rod 133 to properly rotate. The heating rod 133 has been described to be integrally formed in the first rotation shaft 131, but may be separately manufactured and assembled to the first rotation shaft 131 depending on design.

The ice separation guide unit 140 includes a material enabling an injection molding, e.g. a plastic material. The ice separation guide unit 140 includes an ice separation guide 142 having four ice separation slots 144 through which the four heating rods 133 pass at the time of rotation. The ice separation guide 142 extends from an edge of the ice making container 110 to the second rotation shaft 132 within a rotation radius of the heating rod 133. The ice separation guide unit 140 is coupled to a lateral side of the ice making container 110 and guides ice cubes to be discharged after separation by a rotation of the heating and ice separating part 130. The ice separation guide 142 has an arc shape by which the bend radius gradually increased from an end part of the ice separation guide 142 adjacent to the second rotation shaft 132 to an edge of the ice making container 110. As a result, the heating rod 133 which was inserted into the ice cubes to be separated are gradually removed from the ice cubes by passing through the ice separation guide 142.

The rotation driver 150 is coupled to an end of the second rotation shaft 132 and transfers driving power to enable the second rotation shaft 132 to repeat normal rotation and reverse rotation. The rotation driver 150 may be implemented as a stepping motor, and a cam (not shown) may be connected to a driving shaft (not shown) to transfer driving power.

The container supporter 160 includes a material enabling an injection molding, e.g. a plastic material. The container supporter 160 is arranged to cover an upper part of the ice making unit 110 and is fixed to an internal wall of the ice making chamber 13. The container supporter 160 is coupled to and supports the ice making container 110. The container supporter 160 includes a cup 162 to store ice making water therein supplied by an ice making supply pipe. The cup 162 supplies ice making water to an adjacent first ice making cell 112 of ice making container 110 provided below. After the first ice making cell 112 is filled with ice making water, a next ice making cell is filled through the overflow part 115, and all other ice making cells are sequentially filled with ice making water. In a conventional ice making device, a cup storing ice making water therein is integrally attached to an ice making container. As a result, the cup with a predetermined volume additionally transfers cool air to an adjacent ice making cell, thereby making it difficult to control temperature for making transparent ice cubes with the adjacent ice making cell. Meanwhile, the ice making unit 100 according to the disclosure has a cup mounted in the container supporter 160 thereby enabling uniform temperature control for a plurality of ice making cells.

Ice formation starts from a surface of the ice making cells 112 and an entire internal circumference of the ice making cells 112. The heating and ice separating part 130 has a structure enabling the heating rod 133 to rotate and extends from a center to a bottom of the ice making cells 112 having a hemispherical internal circumference. As heat is transferred to ice making water by the heating rod 133, ice formation starts from the location farthest from the heating rod 133 as in FIG. 7.

Figure 11:
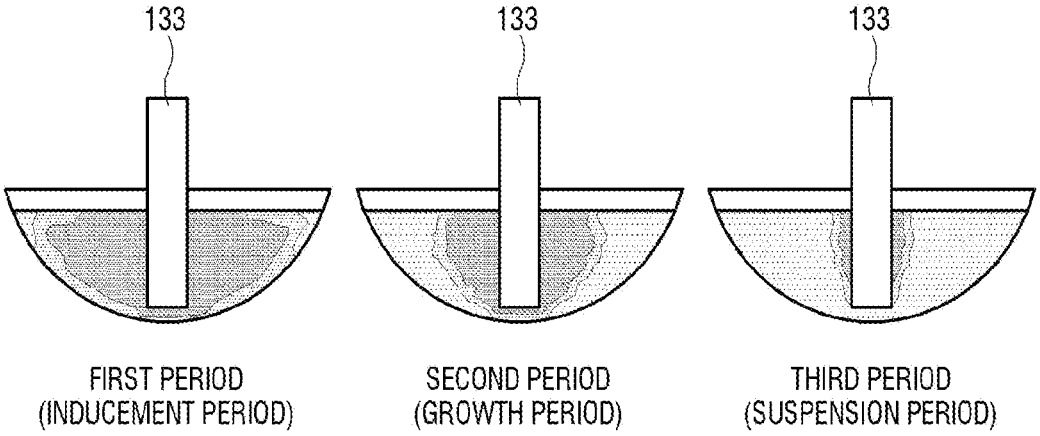
FIG. 11 illustrates a simulation of an ice forming process in an ice making container.

FIG. 11 illustrates a simulation of steps of ice forming directions in the ice making cells 112. At the initial step of an inducement period, ice formation starts from the surface of ice making water and an edge of the ice making cells 112. At the second step of a growth period, ice formation is performed in one direction, i.e. in a direction parallel to the surface toward the heating rod 133 in the center of the ice making cells 112 from an edge of the ice making cells 112. At the third step of a suspension period, ice formation is finished adjacently to the heating rod 133 and ice making is completed. As described above, in the ice making unit 100, ice formation is proceeded with toward the heating rod 133 in a direction parallel with the surface from the location far from the heating rod 133, thereby making it possible to uniformly control an ice making speed and facilitating production of transparent ice cubes.

Figure 12:
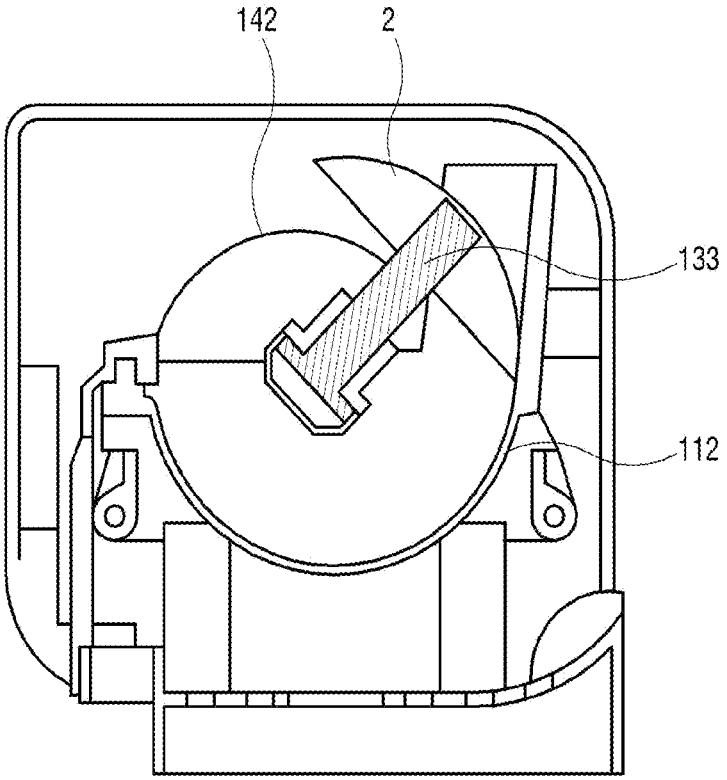
FIGS. 12 and 13 illustrate a process of separating ice cubes made by an ice making device.
Figure 13:
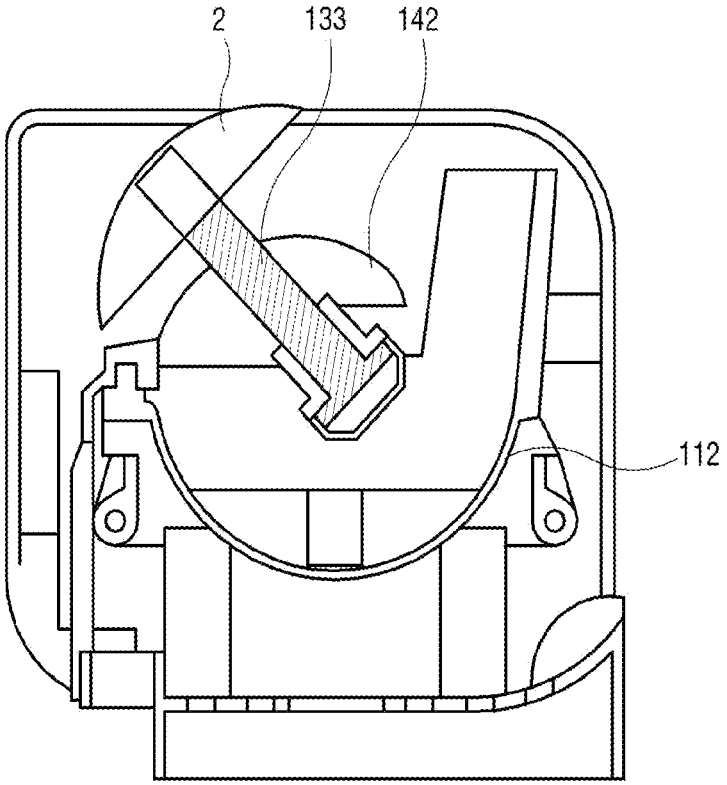

FIGS. 12 and 13 illustrate a ice separation process of the ice making device 100 according to the embodiment of the disclosure.

When ice making is completed, the heating rod 133 is in the state of being inserted into a center of an ice cube. If the heating rod 133 rotates counterclockwise by rotation of the rotation driver 150, the heating rod 133 is separated from the ice making cell 112 in the state of being inserted into an ice cube 2 as in FIG. 12. Then, if the heating rod 133 rotates again and passes through an ice separation slot 144 and the ice separation guide 142 as in FIG. 13, the ice cube is completely separated from the heating rod 133. In the ice making unit 100 according to the disclosure, there is an advantage that the heating rod 133 transfers heat to ice making water to make transparent ice cubes and induces an ice formation direction to one direction at the time of ice formation, and also acts as an ice cube ejector at the time of separation of ice cubes.

Figure 14:
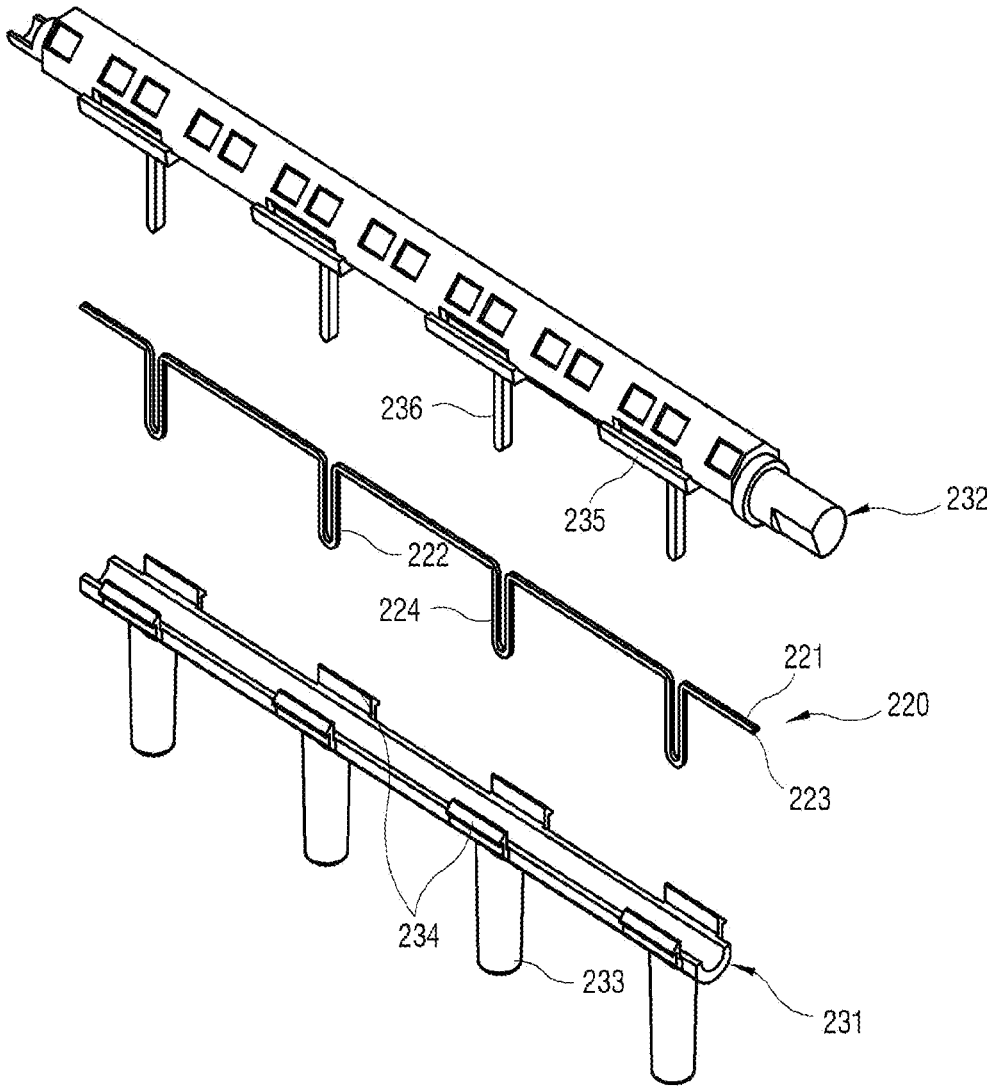
FIGS. 14 and 15 illustrate structures of a heater and heating and ice separating part according to a second embodiment of the disclosure.
Figure 15:
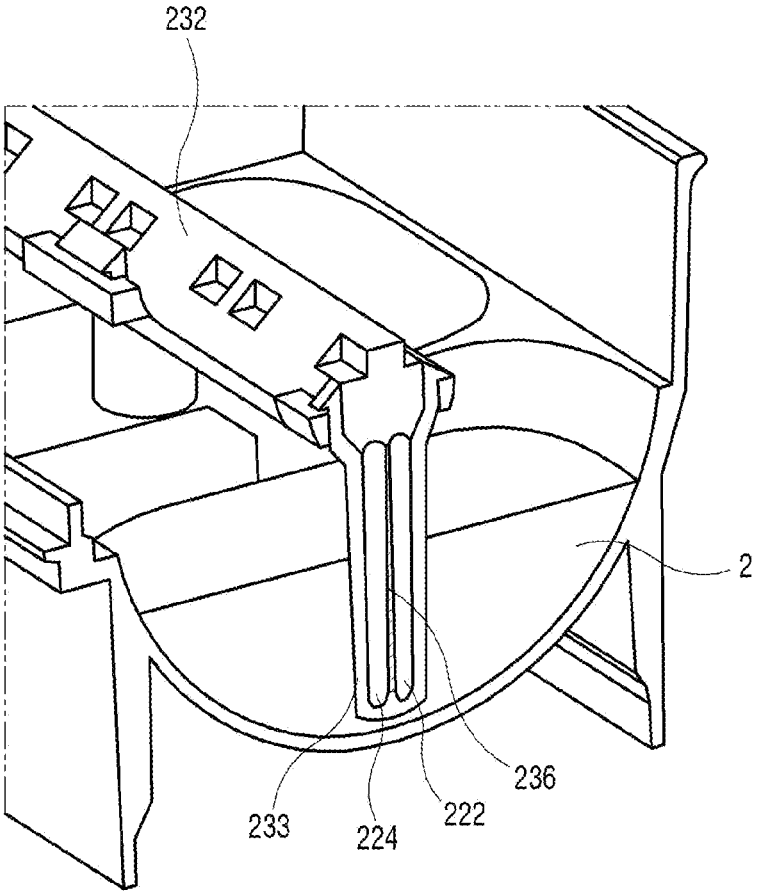

FIGS. 14 and 15 illustrate structures of a heater 220 and a heating and ice separating part 230 according to a second embodiment of the disclosure.

The heater 220 includes four bent parts 222 which are respectively inserted into a hollow part of four heating rods 233. The bent parts 222 heat the heating rods 233 on their own unlike the heat conductivity method according to the foregoing embodiment. The heater 220 includes first and second heating wires 221 and 223 made of a material such as tungsten that generates heat by resistance. The first heating wire 221 includes four first bent parts 222 which extend in a longitudinal direction of a first rotation shaft 231 and are bent in a U-form for the four heating rods 233. The second heating wire 223 is adjacent to the first heating wire 221 and includes four second bent parts 224 which extend in a longitudinal direction of the first rotation shaft 231 and are bent in a U-form for the four heating rods 233. The first and second heating wires 221 and 223 are adjacent to each other and are arranged in pairs and ends parts of the first and second heating wires 221 and 223 are connected to each other. If positive and negative power are applied to the first and second heating wires 221 and 223, the first and second heating wires 221 and 223 generate heat by resistance.

The heating and ice separating part 230 includes a first rotation shaft 231 having a, e.g. semicylindrical shape, a second rotation shaft 232 coupled to an upper part of the first rotation shaft 231 in a longitudinal direction and transferring rotation power, and a heating rod 233 integrally formed in a lower part of the first rotation shaft 231 and extending below the first rotation shaft 231.

In a semicylindrical internal circumference of the first rotation shaft 231, the first and second heating wires 221 and 223 which are adjacent to each other are arranged. The first rotation shaft 231 includes at least one hook 231 to be coupled to the second rotation shaft 232.

The second rotation shaft 232 is manufactured with a plastic materials having a low heat conductivity and enabling an injection molding. The second rotation shaft 232 is coupled to an upper part of the first rotation shaft 231, and transfers rotation power from a rotation driver to the first rotation shaft 231. The second rotation shaft 232 includes at least one hook 결합구 235 coupled to the hook 234 of the first rotation shaft 231 by hook. The second rotation shaft 232 includes four insertion projections 236 that extend downwards. The insertion projections 236 are inserted into a hollow part of the heating rod 233 when the first and second rotation shafts 231 and 232 are coupled to each other. When the insertion projections 236 are inserted into the heating rod 233, the heating rod 233 fixes and supports first and second bent parts 222 and 224 of the first and second heating wire 221 and 223 in the hollow part.

The heating rod 233 extends downwards from a lower part of an external circumference of the first rotation shaft 231. The heating rod 233 includes a hollow part into which the first and second bent parts 222 and 224 of the first and second heating wires 221 and 223 are inserted.

Figure 16:
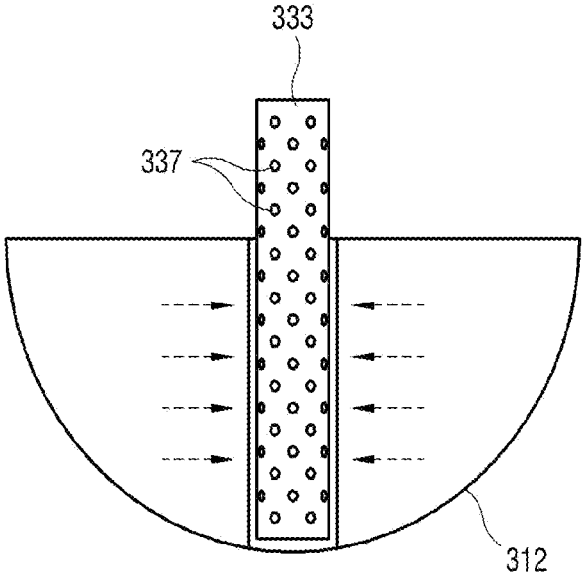
FIG. 16 illustrates a structure of a heating and ice separating part according to a third embodiment of the disclosure.

FIG. 16 illustrates a structure of a heating according to a third embodiment of the disclosure.

The heating rod 333 includes a plurality of openings 337 formed in an external circumference thereof. The openings 337 may be formed to be exposed to the outside along an internal path of the heating rod 333. The heating rod 333 extends from an upper surface of ice making water to a bottom of the ice making cells 312 and is soaked into ice making water. As shown in FIG. 10, ice formation starts from a lateral surface of an internal circumference of the ice making cell 312 and is proceeded with toward the heating rod 333 in the center and is completed at the heating rod 333. Bubbles in ice making water go into the openings 337 of the heating rod 333 to maintain transparency of ice cubes in the vicinity of the heating rod 333. The heating rod 333 may extend to a bottom of the ice making cell 312. An end part of the heating rod 133 may be located by leaving an excess space with an internal circumference of the ice making cells 112 for the heating rod 133 to properly rotate.

Hydrophilic treatment may be performed to an external circumference of the heating rods 133, 233 and 333 to prevent ice around the surface of the heating rod from being opaque at the time when ice formation is completed. The hydrophilic treatment of the external circumference of the heating rod 333 includes chemical treatment, radiation of ultraviolet rays, oxygen plasma treatment, etc.

Figure 17:
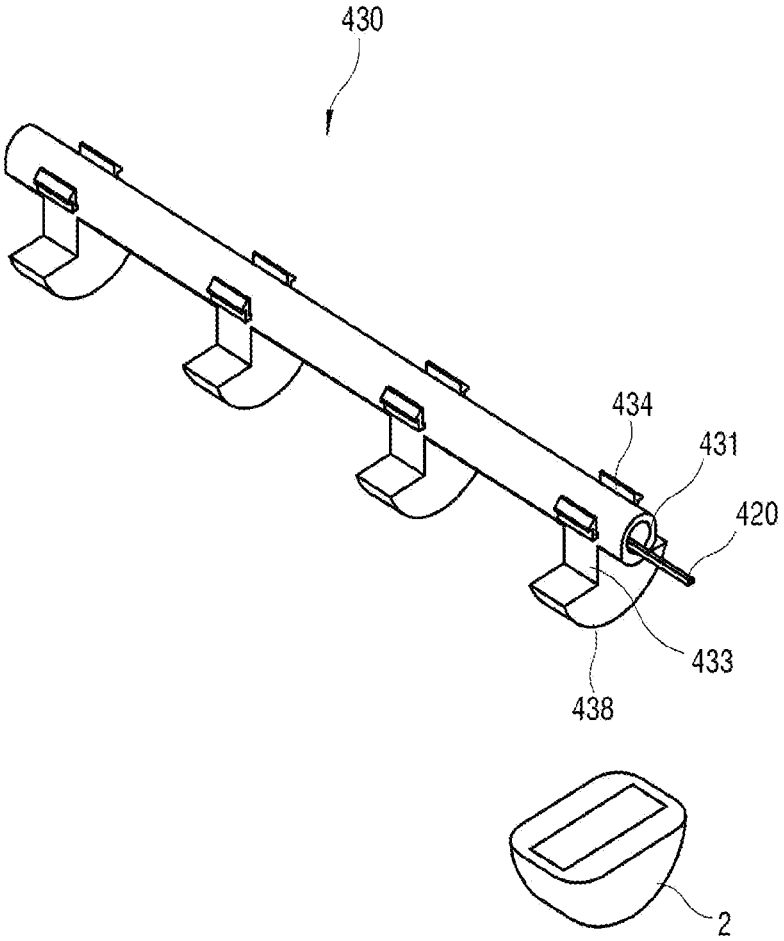
FIGS. 17 and 18 illustrate a structure of a heating and ice separating part according to a fourth embodiment of the disclosure.
Figure 18:
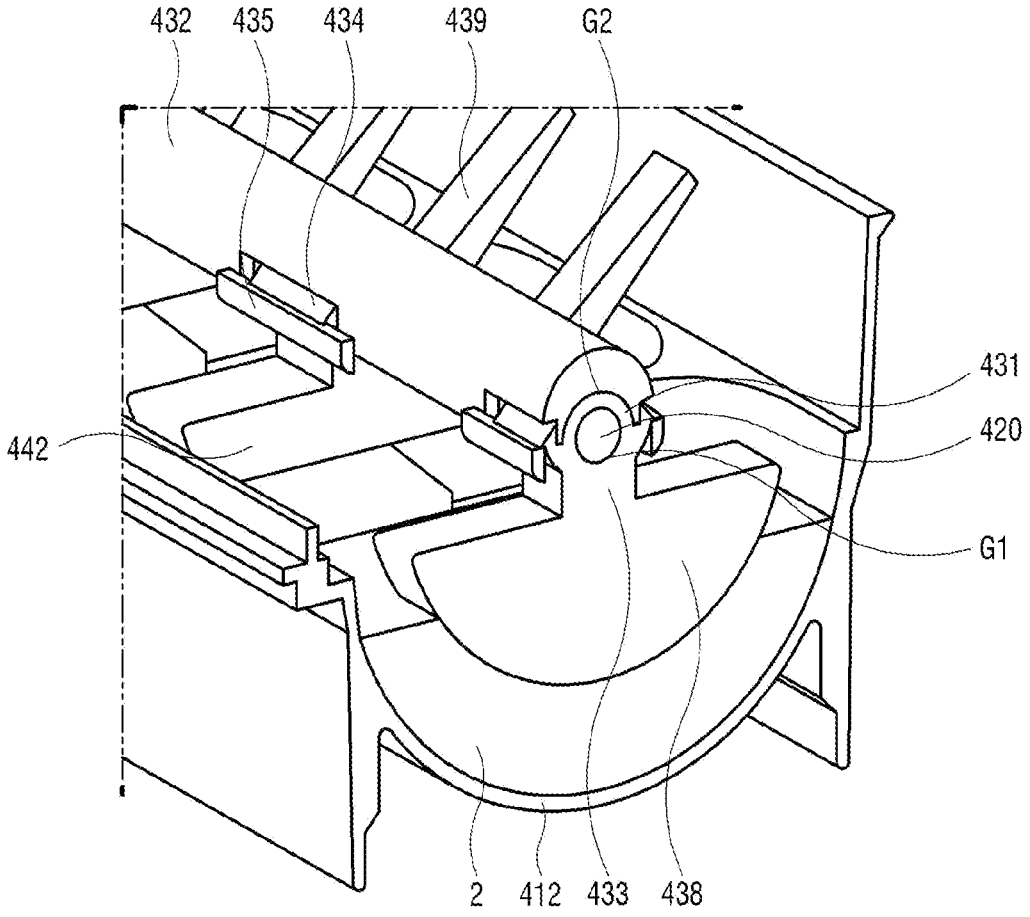

FIGS. 17 and 18 illustrate a structure of a heating and ice separating part 430 according to a fourth embodiment of the disclosure.

The heating and ice separating part 430 includes a first rotation shaft 431 having a hollow part, a second rotation shaft being coupled to the first rotation shaft 431 and transferring rotation power and a heating rod 133 extending from an external circumference of the first rotation shaft 431 and being soaked from a center to a bottom of the ice making cell 412.

The first rotation shaft 431 is shaped like a cylinder, and has a heater 420 inside leaving a first air gap G1 therebetween. The first rotation shaft 431 and the heating rod 433 may be integrally formed and may include a metal material with a heat conductivity being a predetermined value or higher. The first rotation shaft 431 includes at least one hook 434 formed in an external circumference thereof to be coupled to the second rotation shaft 432. The hook coupling of the first and second rotation shafts 431 and 432 is an example, and the first and second rotation shafts 431 and 432 may be coupled by, e.g. adhesive, tight fit or screw.

The second rotation shaft 432 is shaped like a semi-cylinder and is coupled to the first rotation shaft 431 in a longitudinal direction to cause a second air gap G2 to exist. An end part of the second rotation shaft 432 is connected to a rotation driver to receive rotation power therefrom. In the second rotation shaft 432, four ejectors 439 are provided to discharge ice when ice cubes are separated. The ejectors 439 rotate along with a rotation of the second rotation shaft 432. The second rotation shaft 432 includes at least one hook locking part 435 formed in an external circumference to be coupled to the hook 434 of the first rotation shaft 431.

The heating rod 433 extends integrally, e.g. vertically with respect to a longitudinal direction of the first rotation shaft 431. The heating rod 433 includes a heating head 438 formed in an end part of the heating rod 433 and shaped like a half-moon section (anchor). The heating head 438 includes an external circumference having a curvature corresponding to a curvature of an internal circumference of the ice making cell 412. As a result, the internal circumference of the ice making cell 412 and the external circumference of the heating head 438 may have the same shortest distance and ice formation starting from the internal circumference of the ice making cell 412 may be completed at the external circumference of the heating head 438 at the same time.

Figure 19:
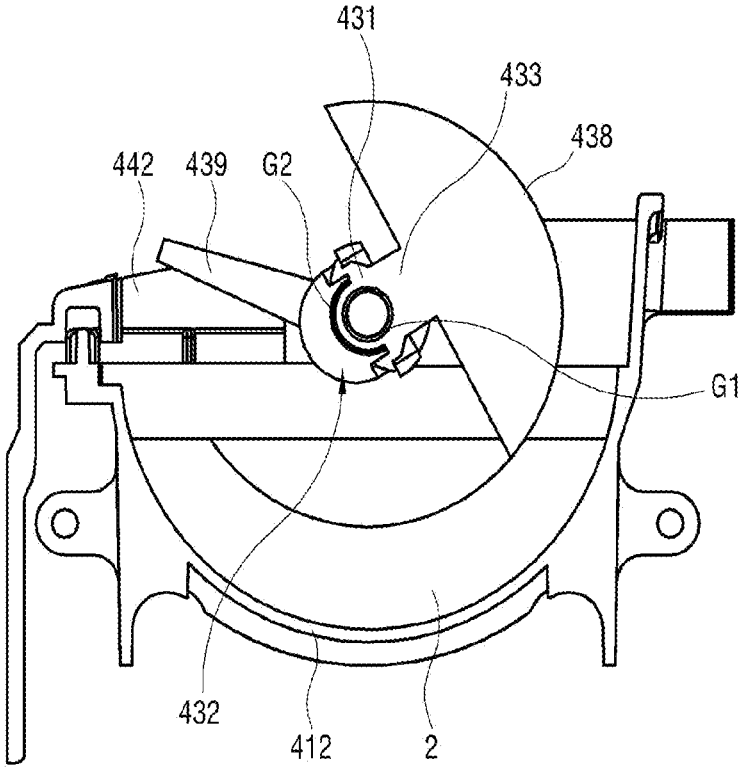
FIG. 19 illustrates a separation of ice cubes by a rotation of the heating and ice separating part according to the fourth embodiment of the disclosure.

FIG. 19 illustrates a separation of ice cubes by the heating and ice separating part 430 according to the fourth embodiment of the disclosure. As shown therein, when the second rotation shaft 432 rotates, the heating head 438 is separated from an ice 2, and the ejector 439 rotating simultaneously with the second rotation shaft 432 pushes the ice 2 upwards from the ice making cell 112. The ice separation guide 442 may be shaped like a panel extending in a transverse direction from an edge of the ice making container.

Figure 20:
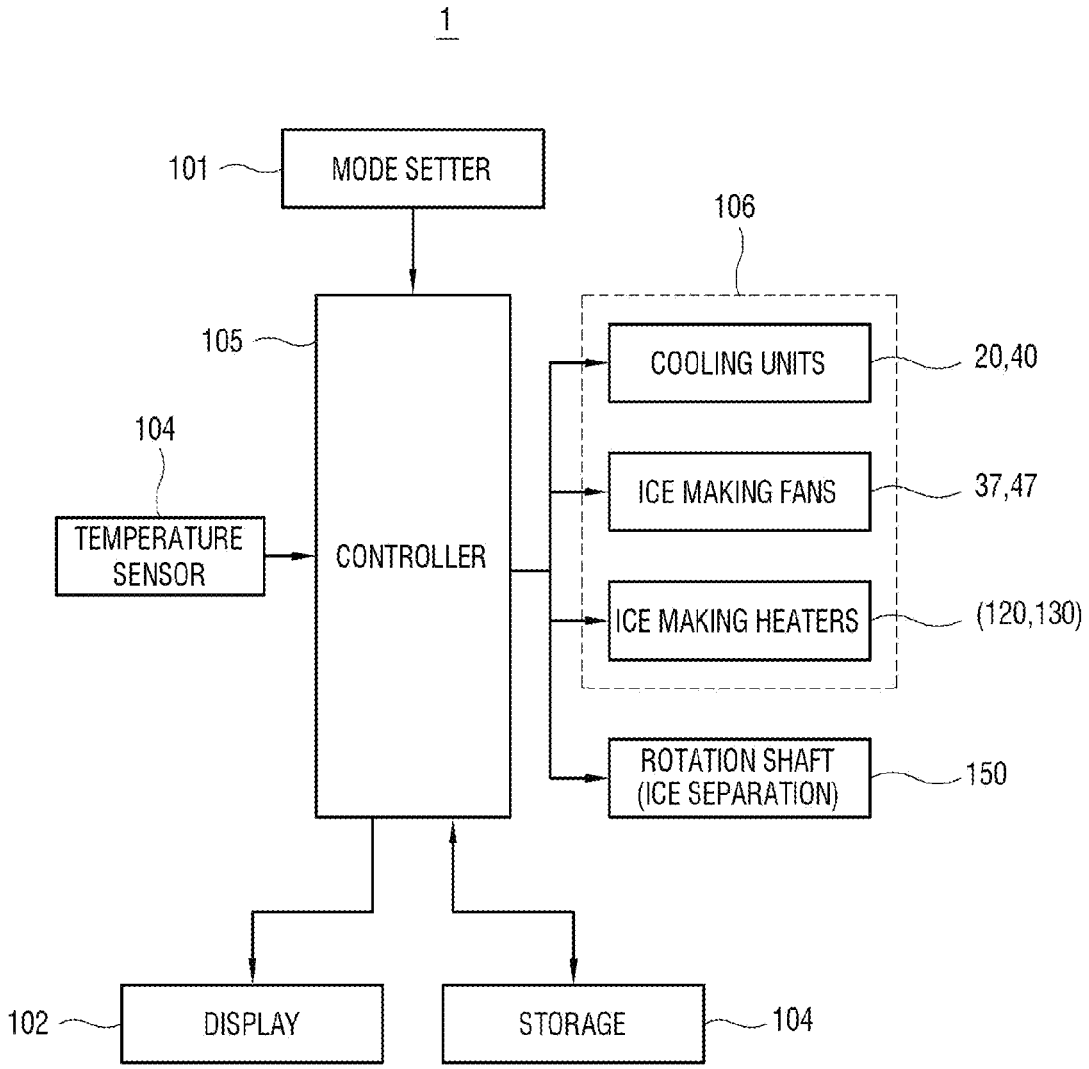
FIG. 20 is a block diagram of a control flow of an ice making device according to an embodiment of the disclosure.

FIG. 20 is a block diagram of a control flow of the ice making device 1 according to the embodiment of the disclosure. Referring to FIG. 20, a control flow of the ice making device 1 according to the embodiment of the disclosure will be described. As shown in FIG. 20, the ice making device 1 includes a mode setter 101, a display 102, a temperature sensor 103, a storage 104, a controller 105 and a cooling system 106.

A target temperature of the ice making device 1 is set to make ice by cooling ice making water in the ice making chamber 13 below a freezing point. The target temperature is set at an initial value when the ice making device 1 is manufactured, and may be changed later by a user's manipulation. The target temperature of the ice making chamber 13 including the ice making unit 100 may be set at, e.g. −20° C. as an initial value.

The ice making unit 100 according to an embodiment of the disclosure operates in one of a normal ice making mode, transparent ice making mode and a fast ice making mode according to a user's selection through a mode setter 101. The normal ice making mode is for making ice with a transparency lower than high-quality transparency. The transparent ice making mode is slow in making ice, and is for making ice with a high transparency of a predetermined value or higher. The fast ice making mode is fast in making ice regardless of transparency, and is for making a large amount of ice in a short time. A user may select one of the foregoing three modes. According to another embodiment, a setting mode may be classified into two modes, i.e. normal ice making and transparent ice making modes, or may be classified into more modes according to transparency.

The ice making device 1 adjusts an ice making temperature of the ice making chamber 13, temperature conditions of the ice making container 110 through a cooling system 106 according to a set mode.

The mode setter 101 may employ a button switch, switch, touch screen, etc. The mode setter 101 may enable a user to select one of the normal ice making mode, transparent ice making mode and fast ice making mode, and may additionally receive commands from a user in relation to the quality of ice, transparency, etc. according to each ice making mode.

The display 102 may employ a liquid crystal display (LCD) panel, an organic light emitting diode (OLED) panel, etc. The display 102 may display thereon information on operation such as set mode information, environmental information on making ice by the ice making chamber 13, target temperature and current temperature of the refrigerating chamber 11 and the freezing chamber 12, power-saving operation, etc.

The temperature sensor 103 is installed in the ice making container 110 and measures a temperature of the ice making container 110. The temperature of the ice making container 110 measured by the temperature sensor 103 is used as information on ice-making control for controlling temperature according to a set ice making mode, ice separation timing, etc.

The storage 104 may employ a flash memory, etc. The storage 104 stores therein control information of the cooling system 106, i.e. cooling units 20 and 40, ice making fans 37 and 47, and ice making heaters 120 and 130, target temperature, operation modes, etc. of the ice making chamber 13, the freezing chamber 12 and the refrigerating chamber 11 and other various information relating to control operations, and measurement information and environmental information.

The controller 105 controls elements of the ice making device 1, e.g. the cooling units 20 and 40, the ice making fans 37 and 47 and the ice making heaters 120 and 130 to generate ice according to the normal ice making mode, the transparent ice making mode or the fast ice making mode set by a user.

The controller 105 may be implemented as an integrated circuit having a control function like e.g. system-on-chip (SoC) or as a general-use processor such as a central processing unit (CPU) and micro processing unit (MPU).

The general-use processor may execute a control program (or instruction) to perform a control operation. The controller 105 may further include a non-volatile memory in which a control program is installed, and a volatile memory to which at least part of the installed control program is loaded.

The cooling system 106 includes the cooling units 20 and 40, the ice making fans 37 and 47, and the ice making heaters 120 and 130.

As described above with reference to FIGS. 2 and 4, the cooling units 20 and 40 include compressors 21 and 41, condensers 22 and 42, expansion valves 24 and 44, a direct cooling part 28a or first and second evaporators 45-1 and 45-2 and refrigerant pipes 28 and 48. The refrigerant pipes 28 and 48 connect the condensers 22 and 42, the expansion valves 24 and 44, the direct cooling part 28a or the first and second evaporators 45-1 and 45-2. A refrigerant flowing through the refrigerant pipes 28 and 48 is discharged from the compressors 21 and 41, and then passes through the condensers 22 and 42 and the expansion valves 24 and 44 and then is supplied to the direct cooling part 28a or the first and second evaporators 45-1 and 45-2. The refrigerant may exchange heat with air in the ice making chamber 13 and cool the air therein.

The ice making fans 37 and 47 are arranged in the ice making chamber 13 and control an ice making speed in the ice making chamber 13 by circulating cool air. The ice making fans 37 and 47 may be mounted in various locations in the ice making chamber 13 for precise control. The ice making fans 37 and 47 may be plurally installed in the ice making chamber 13.

The ice making heaters 120 and 130 are mounted in the ice making chamber 110 to improve transparency of ice, and control temperature of the heating rod 133, adjusts ice making temperature, ice making speed, etc. together with the cooling units 20 and 40 and the ice making fans 37 and 47.

Figure 21:
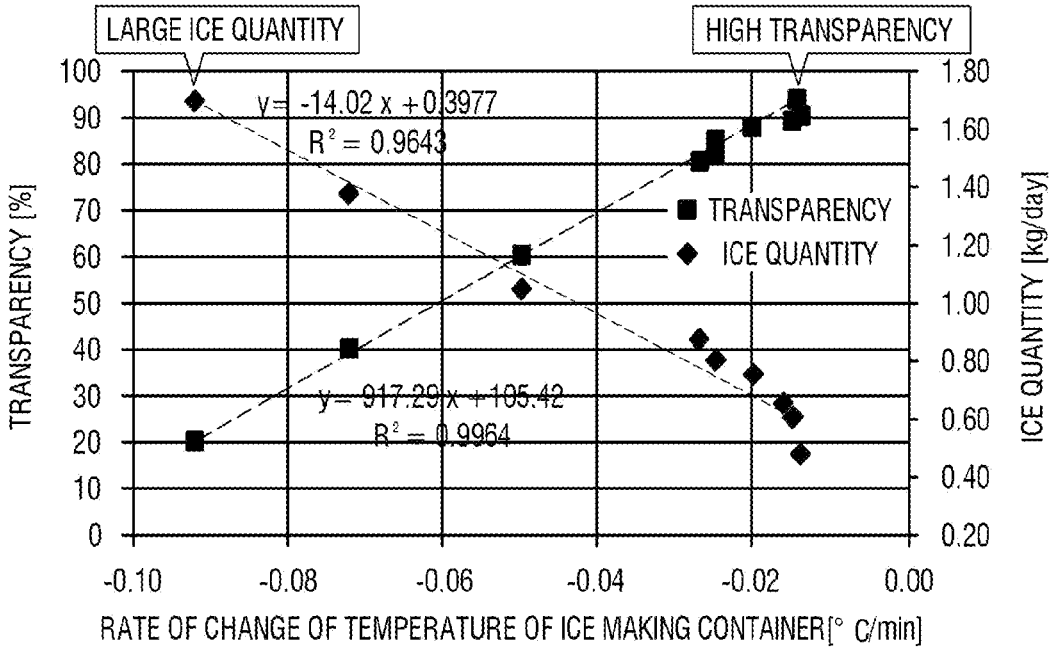
FIG. 21 are a graph and a table showing the relationship between transparency and ice quantity depending on the rate of change of temperature of an ice making container.

FIG. 21 are a graph and a table showing the relationship between transparency and ice quantity depending on the rate of change of temperature of the ice making container 110. As shown therein, the lower the rate of change of temperature of the ice making container 110 is, the higher transparency of ice is and the smaller the ice quantity is. The higher the rate of change of temperature is, the lower the transparency is and the larger the ice volume is.

Figure 22:
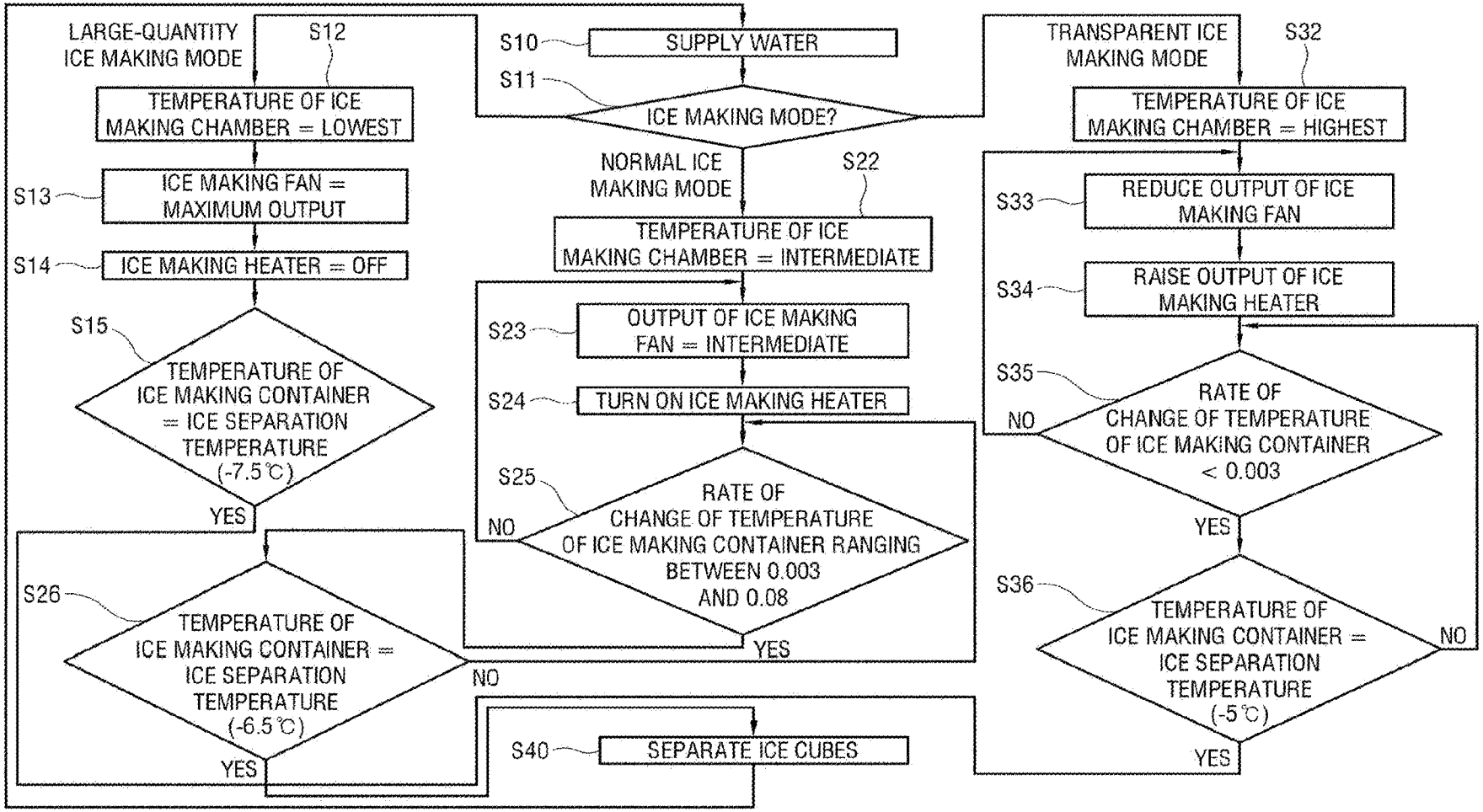
FIG. 22 is a flowchart of an ice making algorithm of an ice making device according to an embodiment of the disclosure.

FIG. 22 is a flowchart of an ice making control process of the ice making device 1 according to the embodiment of the disclosure.

At operation S10, the controller 105 controls to supply ice making water to the ice making container (ice making tray) 110.

At operation S11, the controller 105 determines what ice making mode is set, i.e. whether the mode has been set by a user through the mode setter 101, or the initially set ice making mode such as a large-quantity ice making mode, normal ice making mode and transparent ice making mode. If the mode is the large-quantity ice making mode, operation S12 is performed.

At operation S12, the controller 105 controls the cooling units 20 and 40 to make the temperature of the ice making chamber, e.g. −23° C.

At operation S13, the controller 105 controls the ice making fans 37 and 47 to the maximum output.

At operation S14, the controller 105 turns off the ice making heaters 120 and 130.

At operation S15, the controller 105 monitors the temperature measured by the temperature sensor 104 and determines whether the temperature of the ice making container reaches an ice separation temperature (−7.5° C.).

At operation S40, as the temperature of the ice making container reaches the ice separation temperature (−7.5° C.), the controller 105 controls to separate ice cubes.

Continuously, the foregoing operations are performed repeatedly.

At operation S11, if the ice making mode is the normal ice making mode, the controller 105 performs an operation S22.

At operation S22, the controller 105 controls the cooling units 20 and 40 to make the temperature of the ice making chamber, e.g. −20° C.

At operation S23, the controller 105 controls the ice making fans 37 and 47 to an intermediate output between the maximum and minimum output.

At operation S24, the controller 105 turns on the ice making heaters 120 and 130.

At operation S25, it is determined whether a rate of change of temperature of the ice making container reaches 0.03-0.08. If the rate is below 0.03 and above 0.08, the output of the ice making fans and the ice making heaters is adjusted to make the rate of change of temperature of the ice making container range between 0.03 and 0.08. If the rate of change of temperature of the ice making container ranges between 0.03 and 0.08, the controller 105 performs an operation S26.

At operation S26, the controller 105 monitors the temperature measured by the temperature sensor 104 and determines whether the temperature of the ice making container reaches an ice separation temperature (−6.5° C.).

At operation S40, as the temperature of the ice making container reaches the ice separation temperature (−6.5° C.), the controller 105 controls to separate ice cubes.

Continuously, the foregoing operations are performed repeatedly.

At operation S11, if the ice making mode is the transparent ice making mode, the controller 105 performs an operation S32.

At operation S32, the controller 105 controls the cooling units 20 and 40 to make the temperature of the ice making chamber, e.g. −17° C.

At operation S33, the controller 105 reduces an output of the ice making fans 37 and 47.

At operation S34, the controller 105 increases an output of the ice making fans 37 and 47. The controller 105 may efficiently control the rate of change of temperature of the ice making container by variably controlling an output of the ice making heaters 120 and 130 as shown in FIG. 23 or by repeatedly turning on and off of power at a certain interval as shown in FIG. 24.

Figure 23:
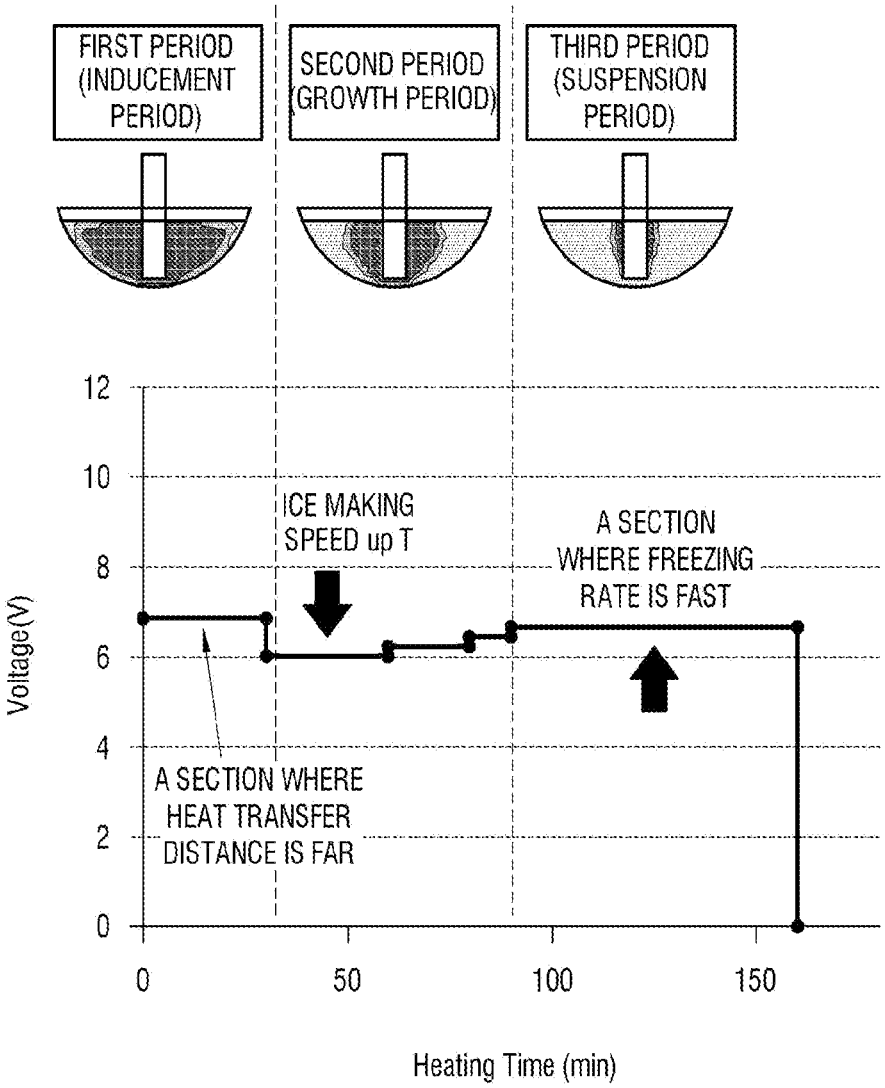
FIG. 23 illustrates a method for controlling an output of an ice making heater set time in a transparent ice making mode.
Figure 24:
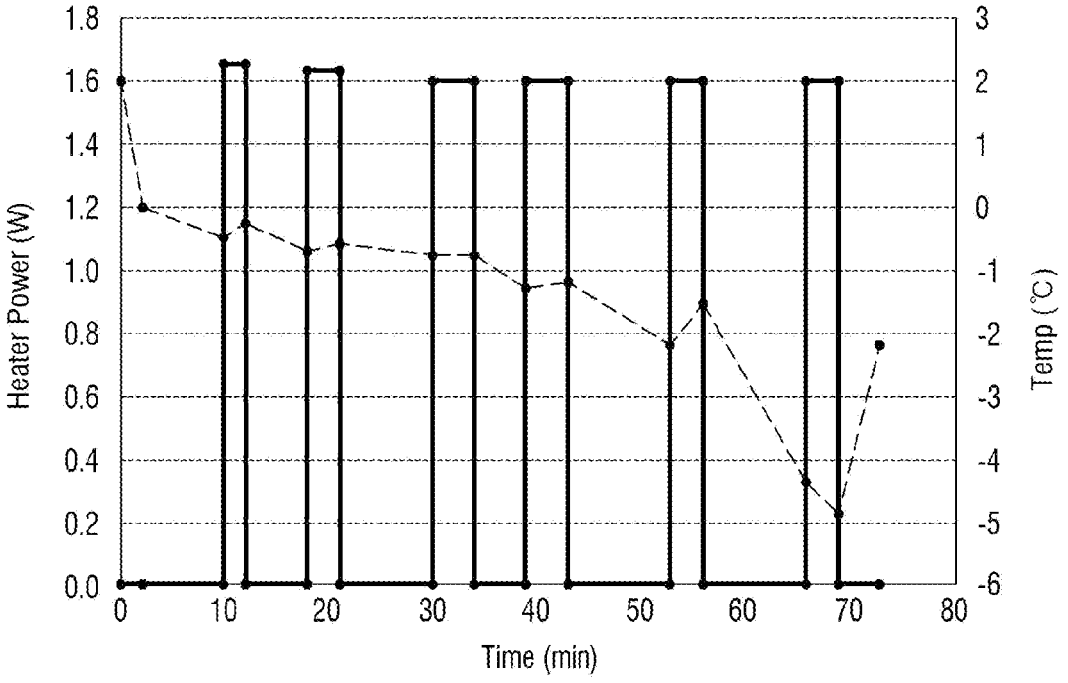
FIG. 24 illustrates a method for controlling turn on and off of an ice making heater per set time in a transparent ice making mode.

FIG. 23 illustrates a method for controlling an output of the ice making heaters 120 and 130 per set time at operation S34.

A first period (inducement period) is a period during which a phase change from ice making water to ice is induced. During this period, the controller 105 applies a single voltage of approximately 6.8V to the ice making heaters for, e.g. 0-30 minutes to control ice formation.

A second period (growth period) is a period during which growth of ice is accelerated at a certain speed or lower. During this period, the controller 105 applies to the ice making heaters a voltage of 5.9V for, e.g. 3060 minutes, a voltage of 6.2V for 6080 minutes and a voltage of 6.4V for 8090 minutes, to grow ice.

A third period (suspension period) is a period with a fastest ice making speed. During this period, the controller 105 applies a voltage of 6.6V to the ice making heaters for, e.g. 90-160 minutes.

FIG. 24 illustrates a method for controlling turn on and off of the ice making heaters per set time at operation S34. In the graph, a transverse axis refers to time (minute), a left longitudinal axis refers to heating power (W), and a right longitudinal axis refers to temperature ( ) of ice making water. As shown therein, the controller performs several time a process of turning on the ice making heaters, of maintaining the on state of the same for certain time and then of turning off the ice making heaters per set time until ice formation if completed. More specifically, the ice making heaters are turned on and off with electricity of 1.6 W for predetermined time (For irregular time) approximately every ten minutes. As a result, while the ice making heaters are turned on and off for control, the temperature of ice making water is gradually lowered to slow down a freezing rate.

At operation S35, the controller 105 continuously monitors a temperature measured by the temperature sensor 104 and determines whether the rate of change of temperature of the ice making container reaches e.g. below 0.003. If the rate of change of temperature of the ice making container is 0.003 or higher, the controller 105 reduces an output of the ice making fans 37 and 47, and raises an output of the ice making heaters 120 and 130.

Figure 25:
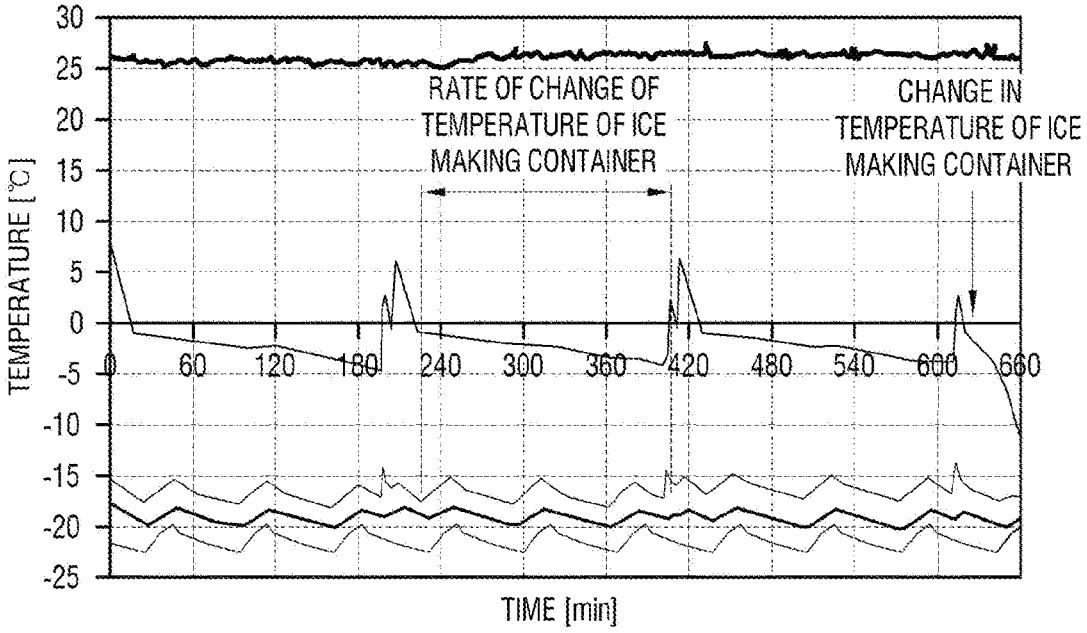
FIG. 25 is a graph showing changes to temperature of an ice making container.

FIG. 25 is a graph showing changes to temperature of the ice making container. As shown in the graph, it can be known that the controller 105 controls the ice making fans 37 and 47 and the ice making heaters 120 and 130 to repeatedly control the rate of change of temperature of the ice making container to be below 0.003 for a certain time according to the set transparent ice making mode.

At operation S36, the controller 105 determines whether the rate of change of temperature of the ice making container is less than 0.003 and a temperature of the ice making container reaches an ice separation temperature (−5° C.). The ice separation temperature of the transparent ice making mode is −5° C., which is higher than −6.5° C. as an ice separation temperature of the normal ice making mode and −7.5° C. as an ice separation temperature of the large-quantity ice making mode.

At operation S40, as the temperature of the ice making container reaches the ice separation temperature (−5° C.), the controller 105 controls to separate ice cubes.

Continuously, the controller 105 returns to the beginning and repeats a control operation for making ice.

Figure 26:
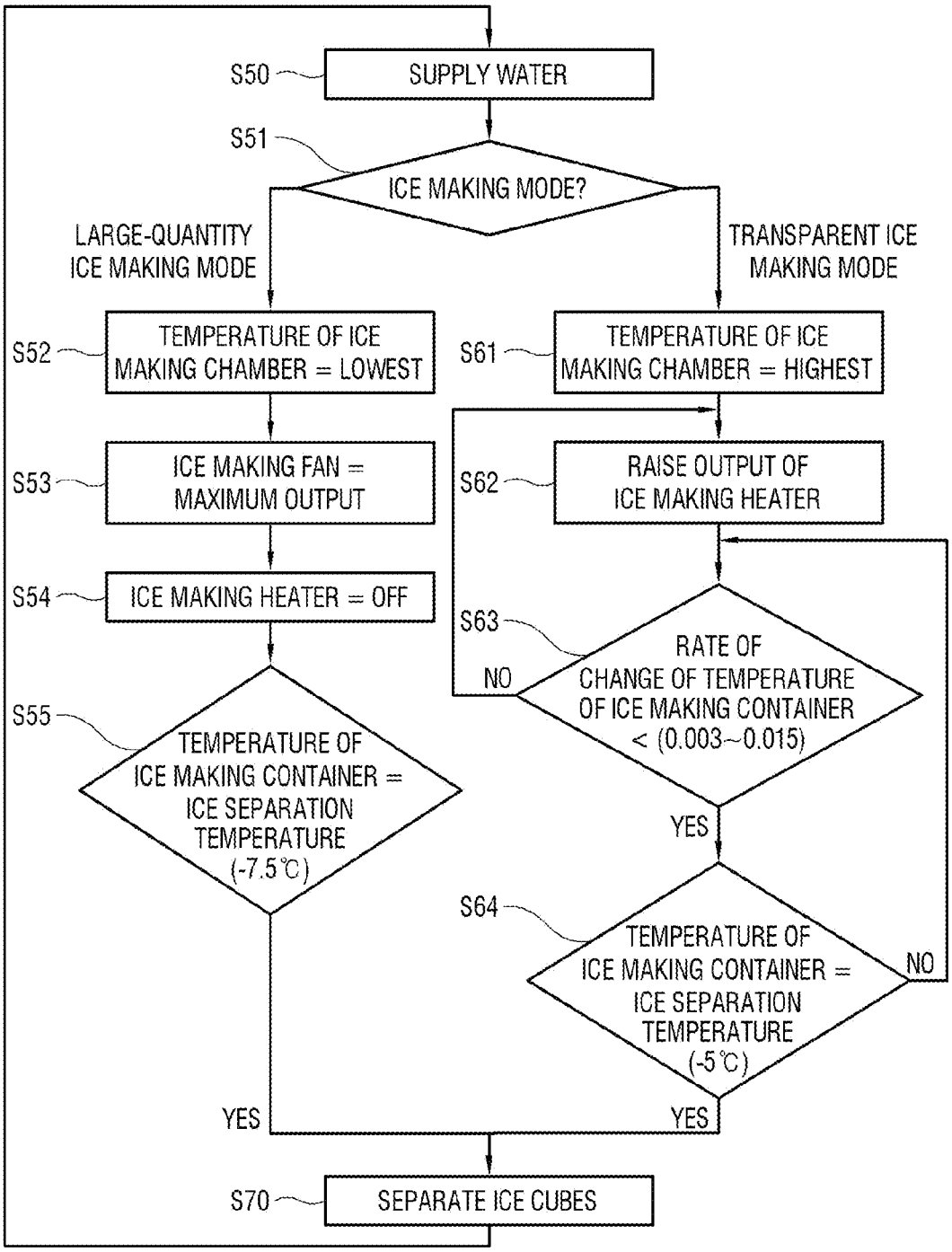
FIG. 26 is a flowchart of an ice making algorithm of an ice making device according to a second embodiment of the disclosure.

FIG. 26 is a flowchart of an ice making process of the ice making device 1 according to a second embodiment of the disclosure. An ice making mode is classified into a large-quantity ice making mode and a transparent ice making mode.

At operation S50, the controller 105 supplies ice making water to the ice making container (ice making tray) 110.

At operation S51, the controller 105 determines whether an ice making mode set by a user through the mode setter 101 or initially set is the transparent ice making mode. If the ice making mode is not the transparent ice making mode, the controller 105 proceeds with an operation S52.

At operation S52, the controller 105 controls the cooling units 20 and 40 to make a temperature of the ice making chamber lowest.

At operation S53, the controller 105 controls the ice making fans 37 and 47 to operate with a maximum output.

At operation S54, the controller 105 controls on and off of the ice making heaters 120 and 130.

At operation S55, the controller 105 monitors a temperature measured by the temperature sensor 104 and determines whether the temperature of the ice making container reaches, e.g. −7.5° C.

At operation S70, as the temperature of the ice making container reaches −7.5° C.), the controller 105 controls to separate ice cubes.

Continuously, the controller 105 returns to the beginning and repeats a control operation for making ice.

At operation S51, if the ice making mode is the transparent ice making mode, the controller 105 proceeds with an operation S61.

At operation S61, the controller 105 controls a temperature of the ice making chamber to be maintained at, e.g. −17° C.

At operation S62, the controller 105 raises an output of the ice making heaters 120 and 130. The controller 105 may efficiently control the rate of change of temperature of the ice making container by variably controlling an output of the ice making heaters 120 and 130 as shown in FIG. 23 or by repeatedly turning on and off of power at a certain interval as shown in FIG. 24

At operation S63, the controller 105 continuously monitors a temperature measured by the temperature sensor 104 and determines whether the rate of change of temperature of the ice making container ranges e.g. between 0.003 and 0.015. If the rate of change of temperature of the ice making container is higher than 0.003, the controller 105 further raises an output of the ice making heaters 120 and 130.

At operation S64, the controller 105 determines whether the rate of change of temperature of the ice making container ranges, e.g. between 0.003 and 0.015 and whether a temperature of the ice making container reaches, e.g. −5° C. The ice separation temperature of the transparent ice making mode is −5° C., which is higher than −7.5° C. as an ice separation temperature of the large-quantity ice making mode.

At operation S70, as the temperature of the ice making container reaches −5° C., the controller 105 controls to separate ice cubes.

Continuously, the controller 105 returns to the beginning and repeats a control operation for making ice.

According to the second embodiment, the controller 105 adjusts the rate of change of temperature of the ice making container with the temperature of the ice making chamber and the output of the ice making heater.

Figure 27:
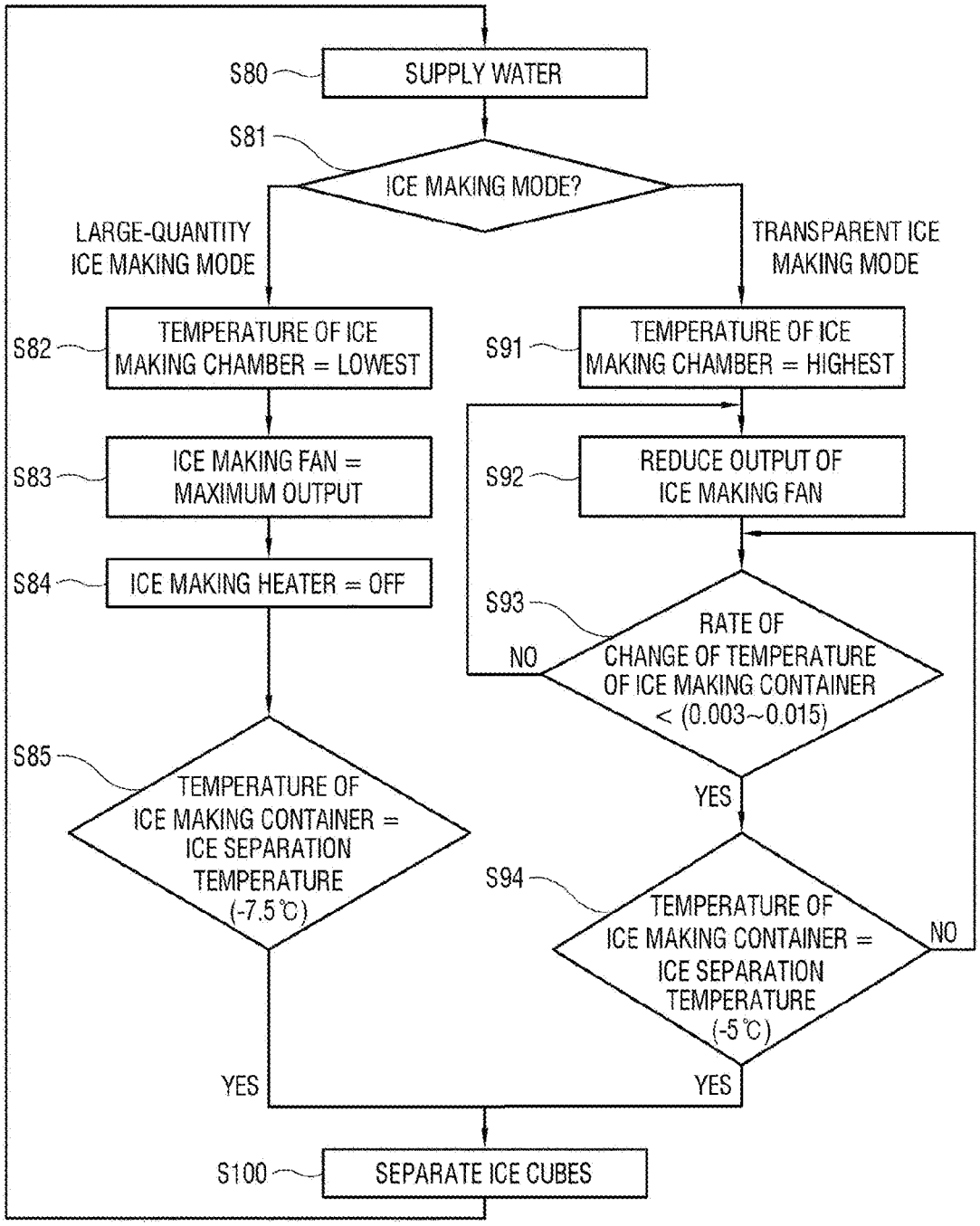
FIG. 27 is a flowchart of an ice making algorithm of an ice making device according to a third embodiment of the disclosure.

FIG. 27 is a flowchart of a control process of the ice making device 1 according to a third embodiment of the disclosure. An ice making mode is classified into a large-quantity ice making mode and a transparent ice making mode.

At operation S80, the controller 105 supplies ice making water to the ice making container (ice making tray) 110.

At operation S81, the controller 105 determines whether an ice making mode set by a user through the mode setter 101 or initially set is the large-quantity ice making mode or the transparent ice making mode. If the ice making mode is the large-quantity ice making mode, the controller 105 proceeds with an operation S82.

At operation S82, the controller 105 controls the cooling units 20 and 40 to make a temperature of the ice making chamber lowest.

At operation S83, the controller 105 controls the ice making fans 37 and 47 to operate with a maximum output.

At operation S84, the controller 105 controls to turn off the ice making heaters 120 and 130.

At operation S85, the controller 105 monitors a temperature measured by the temperature sensor 104 and determines whether the temperature of the ice making container reaches, e.g. −7.5° C.

At operation S100, as the temperature of the ice making container reaches −7.5° C., the controller 105 controls to separate ice cubes.

Continuously, the controller 105 returns to the beginning and repeats a control operation for making ice.

At operation S81, if the ice making mode is the transparent ice making mode, the controller 105 proceeds with an operation S92.

At operation S91, the controller 105 controls the cooling units 20 and 40 to make the temperature of the ice making chamber, e.g. −17° C.

At operation S92, the controller 105 reduces an output of the ice making fans 37 and 47.

At operation S93, the controller 105 continuously monitors a temperature measured by the temperature sensor 104 and determines whether the rate of change of temperature of the ice making container ranges e.g. between 0.003 and 0.015. If the rate of change of temperature of the ice making container is higher than 0.003, the controller 105 further reduces an output of the ice making fans 37 and 47.

At operation S94, the controller 105 determines whether the rate of change of temperature of the ice making container ranges, e.g. between 0.003 and 0.015 and whether a temperature of the ice making container reaches, e.g. −5° C. The ice separation temperature of the transparent ice making mode is −5° C., which is higher than −7.5° C. as an ice separation temperature of the large-quantity ice making mode.

At operation S100, as the temperature of the ice making container reaches −5° C., the controller 105 controls to separate ice cubes.

Continuously, the controller 105 returns to the beginning and repeats a control operation for making ice.

In the foregoing transparent ice making mode, the rate of change of temperature of the ice making container is controlled only by an output of the ice making fans excluding the ice making heaters.

Table 1 below shows controls of elements of a cooling system 106 according to ice making modes.

TABLE 1

| | Fast Ice Making Mode | Normal Ice Making Mode | Transparent Ice Making Mode |
|---|---|---|---|
| Transparency | 20% | 60% | 90% |
| Temperature of ice making chamber | −23° C. | −20° C. | −17° C. |
| Ice making heaters | OFF | Output control | Output control |
| Ice making fans | Maximum | Output control | Output control |
| Rate of change of temperature of ice making container | Higher than 0.08 | 0.03~0.08 | Less than 0.03 |

In a fast ice making mode, the controller 150 turns off the ice making heaters, adjusts a temperature of the ice making chamber to the lowest temperature, i.e. −23° C., and controls the ice making fans to the maximum out so that the transparency reaches 20% and the rate of change of temperature is higher than 0.08.

In a normal ice making mode, the controller 150 controls an output of the ice making heaters, adjusts the ice making chamber to −20° C. and controls an output of the ice making fans so that the transparency reaches 60% and the rate of change of temperature is maintained within the range of 0.03 to 0.08.

In a transparent ice making mode, the controller 150 controls an output of the ice making heaters, adjusts a temperature of the ice making chamber to −17° C. and controls an output of the ice making fans so that the transparency reaches, e.g. 90% and the rate of change of temperature is maintained below 0.03.

Although a few embodiments of the disclosure have been described in detail, various changes can be made in the disclosure without departing from the scope of claims.

The invention claimed is:

1. An ice making device comprising:

an ice making chamber including an ice making container to accommodate ice making water;

a cooler configured to supply cool air to the ice making chamber to cool the ice making water;

an ice making fan configured to circulate the supplied cool air;

an ice making heater configured to supply heat to the ice making water when the ice making water is cooled; and a processor configured to;

identify whether a rate of change of temperature of the ice making container is within a range preset to correspond to a currently executed ice making mode from among a plurality of ice making modes; and based on the rate of change of temperature of the ice making container being not within the preset range of change, control the cooler, the ice making fan and the ice making heater to adjust the rate of change of temperature of the ice making container within the preset range of change to generate a type of ice corresponding to the preset range of change from among a plurality of types of ice having different transparency.

2. The ice making device according to claim 1, further comprising a temperature sensor installed in the ice making container to measure a temperature of the ice making container.

3. The ice making device according to claim 1, wherein the processor is configured to reduce an output of the ice making heater and raise an output of the cooler and the ice making fan provided the rate of change of temperature of the ice making container is lower than a set rate of change.

4. The ice making device according to claim 1, wherein the plurality of types of ice having different transparency is generated in a fast ice making mode, a normal ice making mode and a transparent ice making mode according to the rate of change of temperature of the ice making container.

5. The ice making device according to claim 4, wherein at least one of the plurality of types of ice having different transparency is generated in a normal ice making mode in which the rate of change of temperature of the ice making container ranges between 0.03 and 0.08 (° C./min).

6. The ice making device according to claim 4, wherein the processor is configured to turn off the ice making heater in the fast ice making mode.

7. The ice making device according to claim 4, wherein the processor is configured to vary an output of the ice making heater in the transparent ice making mode.

8. The ice making device according to claim 4, wherein the temperature of the ice making container at the time of separation of ice cubes in the transparent ice making mode is higher than a temperature of the ice making container at the time of separation of ice cubes in the fast ice making mode.

9. The ice making device according to claim 1, wherein the ice making heater comprises a heating rod configured to extend from a surface of the ice making water to a bottom of the ice making container to be soaked into the ice making water and transfer heat to the ice making water, and a rotation shaft connected to the heating rod and configured to extend to cross an upper part of the ice making container and rotate the heating rod to separate the heating rod from the ice making container.

10. The ice making device according to claim 9, wherein the rotation shaft comprises a hollow part in a longitudinal direction, and the ice making heater comprises a heater accommodated in the hollow part of the rotation shaft and heating the heating rod.

11. The ice making device according to claim 10, wherein the heater is provided to cause a first air gap to exist between the heater and an internal circumference of the rotation shaft.

12. The ice making device according to claim 9, further comprising a heater supplying heat to a rotation driver rotating the rotation shaft and to the heating rod, wherein the rotation shaft comprises a first rotation shaft configured to support the heater and comprising the heating rod, and a second rotation shaft coupled to the first rotation shaft and configured to transfer a driving force of the rotation driver to the first rotation shaft.

13. The ice making device according to claim 12, wherein the first rotation shaft comprises a material with a high heat conductivity, and the second rotation shaft comprises a material with a heat conductivity lower than the first rotation shaft.

14. The ice making device according to claim 12, wherein the second rotation shaft is provided to cause a second air gap to exist between the second rotation shaft and the first rotation shaft.

15. The ice making device according to claim 9, further comprising a heater configured to supply heat to the heating rod, wherein the heating rod comprises a hollow part provided inside and has the heater accommodated in the hollow part.

*16. A refrigerator comprising:*

*a main body;*

*an ice maker arranged inside the main body and configured to generate ice; and*

*a controller configured to control the ice maker in an ice-making mode selected from a plurality of ice making modes,*

*wherein the ice maker includes:*

*an ice-making container including a plurality of ice-making cells in which ice-making water is to be accommodated;*

*a heater configured to supply the ice-making cells with heat when cooling the ice-making water; and*

*a container support arranged to cover at least an upper portion of the ice-making container, wherein the container support is coupled to the ice-making container, fixed to the main body, and comprises a cup configured to supply the ice-making water to at least one of the plurality of ice-making cells, and*

*wherein the controller is configured to turn on the heater in each of the plurality of ice-making modes, and differently control the heater in respective modes of the plurality of ice-making modes.*

*17. The refrigerator of claim 16, wherein the plurality of ice making modes include:*

*a first ice-making mode in which the heater is to be turned on and the output of the heater has a first level; and*

*a second ice-making mode in which the heater is to be turned on and the output of the heater has a second level higher than the first level.*

*18. The refrigerator of claim 17, wherein the controller is configured to adjust the output of the heater to have different levels between a plurality of ice-making operations in the second ice-making mode.*

*19. The refrigerator of claim 18, wherein the controller is configured to apply a first voltage to the heater in a first ice-making operation of the second ice-making mode, and apply a second voltage lower than the first voltage to the heater in a second ice-making operation performed after the first ice-making operation.*

*20. The refrigerator of claim 17, wherein the controller is configured to alternate between turning on and turning off the heater during a set time in the second ice-making mode.*

*21. The refrigerator of claim 17, further comprising a temperature sensor configured to measure a temperature of the ice-making container,*

*wherein the controller is configured to perform ice separating in response to the temperature of the ice-making container reaching an ice-separating temperature that is set according to the first ice-making mode or the second ice-making mode.*

*22. The refrigerator of claim 21, wherein the ice separating temperature of the second ice-making mode is higher than the ice separating temperature of the first ice-making mode.*

*23. The refrigerator of claim 17, wherein the controller is configured to set an ice-making speed for the first ice-making mode to be different from an ice-making speed for the second ice-making mode.*

*24. The refrigerator of claim 16, further comprising:*

*a mode setter configured to receive a command for a user to select one of the plurality of ice-making modes; and*

*a display provided to display the ice-making mode selected from among the plurality of ice-making modes.*

*25. The refrigerator of claim 16, wherein the main body comprises a freezing chamber and an ice making chamber, wherein the ice maker is located in the ice making chamber.*

*26. The refrigerator of claim 16, wherein the cup is mounted to the container support.*

*27. A method of controlling a refrigerator including an ice-making container including a plurality of ice-making cells in which ice-making water is accommodated and a heater configured to supply the plurality of ice-making cells with heat when cooling the ice-making water, the method comprising:*

*receiving an input selecting a first ice-making mode or a second ice-making mode through a mode setter;*

*turning on the heater based on the first ice-making mode being selected, and turning on the heater based on the second ice-making mode being selected; and*

*adjusting an output of the heater based on the selected ice-making mode so that ice generated in the first ice-making mode has a transparency different from a transparency of ice generated in the second ice-making mode.*

*28. The method of claim 27, wherein the adjusting of the output of the heater includes*

*adjusting the output of the heater to have different levels between a plurality of ice-making operations in the second ice-making mode.*

*29. The method of claim 28, wherein the adjusting of the output of the heater includes*

*applying a first voltage to the heater in a first ice-making operation of the second ice-making mode, and applying a second voltage lower than the first voltage to the heater in a second ice-making operation performed after the first ice-making operation.*

*30. The method of claim 27, wherein the adjusting of the output of the heater includes*

*alternating between turning on and turning off the heater during a set time in the second ice-making mode.*

*31. The method of claim 27, wherein an ice-making speed in the first ice-making mode is set to be different from an ice-making speed in the second ice-making mode.*

*32. The method of claim 27, wherein the adjusting of the output of the heater includes:*

*controlling the heater such that the output of the heater in the second ice-making mode is higher than the output of the heater in the first ice-making mode.*

*33. A refrigerator comprising:*

*an ice maker;*

*a controller configured to control the ice maker in an ice-making mode selected from a plurality of ice making modes,*

*wherein the ice maker includes:*

*an ice-making container including a plurality of ice-making cells in which ice-making water is to be accommodated;*

*a heater configured to supply the ice-making cells with heat when cooling the ice-making water; and*

*a container support arranged to cover at least an upper portion of the ice-making container, wherein the container support is coupled to the ice-making container, and comprises a cup that is configured to supply the ice-making water to at least one of the plurality of ice-making cells, and*

*wherein the controller is configured to turn on the heater in each of the plurality of ice-making modes and to control the heater in a first manner in a first of the plurality of ice-making modes and in a second manner in a second of the plurality of ice-making modes, the first and second manners being different.*

*34. The refrigerator of claim 33, wherein the plurality of different ice-making modes are configured to provide for different ice transparencies, respectively.*

* * * * *